US012768279B2

(12) United States Patent
Freeman et al.

(10) Patent No.: US 12,768,279 B2
(45) Date of Patent: Oct. 20, 2026

(54) TURBINE SHROUD SEGMENTS WITH DAMPING STRIP SEAL ASSEMBLIES

(71) Applicants: Rolls-Royce Corporation, Indianapolis, IN (US); Rolls-Royce plc, London (GB)

(72) Inventors: Ted J. Freeman, Indianapolis, IN (US); Aaron D. Sippel, Indianapolis, IN (US); David J. Thomas, Indianapolis, IN (US); Clark Snyder, Indianapolis, IN (US); Sean Walters, London (GB)

(73) Assignees: Rolls-Royce Corporation, Indianapolis, IN (US); Rolls-Royce plc (GB)

( * ) Notice: Subject to any disclaimer, the term of this patent is extended or adjusted under 35 U.S.C. 154(b) by 318 days.

(21) Appl. No.: 18/528,728

(22) Filed: Dec. 4, 2023

(65) Prior Publication Data

US 2026/0022642 A1 Jan. 22, 2026

(51) Int. Cl.

| | |
|---|---|
| ***F01D 11/00*** | (2006.01) |
| ***F01D 9/04*** | (2006.01) |
| ***F01D 25/04*** | (2006.01) |
| ***F01D 25/24*** | (2006.01) |
| *F01D 11/08* | (2006.01) |

(52) U.S. Cl.

CPC ................ *F01D 11/00* (2013.01); *F01D 9/04* (2013.01); *F01D 11/005* (2013.01); *F01D 25/04* (2013.01); *F01D 25/246* (2013.01); *F01D 11/08* (2013.01); *F05D 2230/60* (2013.01); *F05D 2260/96* (2013.01)

(58) Field of Classification Search

CPC ...... F01D 11/005; F01D 11/08; F01D 25/246; F01D 9/04; F01D 9/041

See application file for complete search history.

(56) References Cited

U.S. PATENT DOCUMENTS

| | | | |
|---|---|---|---|
| 7,207,771 | B2 | 4/2007 | Synnott et al. |
| 7,217,089 | B2 | 5/2007 | Durocher et al. |
| 7,374,395 | B2 | 5/2008 | Durocher et al. |
| 7,513,740 | B1 | 4/2009 | Hervy et al. |
| 7,600,967 | B2 | 10/2009 | Pezzetti, Jr. et al. |
| 7,771,159 | B2 | 8/2010 | Johnson et al. |
| 7,901,186 | B2 | 3/2011 | Cornett et al. |
| 8,206,087 | B2 | 6/2012 | Campbell et al. |
| 8,303,245 | B2 | 11/2012 | Foster et al. |
| 8,641,371 | B2 | 2/2014 | Nakamura et al. |
| 8,651,497 | B2 | 2/2014 | Tholen et al. |

(Continued)

FOREIGN PATENT DOCUMENTS

| | | | |
|---|---|---|---|
| EP | 1965031 | A2 | 9/2008 |
| EP | 3543468 | A1 | 9/2019 |
| FR | 3056636 | A1 | 3/2018 |

*Primary Examiner* — Courtney D Heinle

*Assistant Examiner* — Behnoush Haghighian

(74) *Attorney, Agent, or Firm* — Barnes & Thornburg

(57) ABSTRACT

A turbine shroud assembly for use with a gas turbine engine includes a first shroud segment, a second shroud segment, and a damping strip seal assembly. The first shroud segment has a first carrier segment arranged circumferentially at least partway around a central axis and a first blade track segment supported by the first carrier segment. The second shroud segment is arranged circumferentially adjacent the first shroud segment. The damping strip seal assembly includes a body segment and a damping segment that extends along a curvilinear path.

20 Claims, 12 Drawing Sheets

(56) References Cited

U.S. PATENT DOCUMENTS 8,684,680 B2 4/2014 Martin et al.
8,784,041 B2 7/2014 Durocher et al.
8,845,285 B2 9/2014 Weber et al.
8,905,708 B2 12/2014 Weber et al.
9,051,846 B2 * 6/2015 Arilla .................... F01D 25/246
9,079,245 B2 7/2015 Durocher et al.
9,534,500 B2 1/2017 Bouchard et al.
9,708,922 B1 7/2017 Davis et al.
9,714,580 B2 7/2017 Slavens et al.
9,745,854 B2 8/2017 Baldiga et al.
9,759,079 B2 * 9/2017 Sippel ....................... F01D 5/24
9,863,265 B2 * 1/2018 Stapleton ................ F01D 11/08
9,863,323 B2 1/2018 Kirtley et al.
9,869,201 B2 1/2018 Dyson et al.
9,874,104 B2 1/2018 Shapiro
9,915,162 B2 3/2018 Duguay
9,945,484 B2 4/2018 Moehrle et al.
9,957,827 B2 5/2018 Davis et al.
9,982,550 B2 5/2018 Davis
9,988,919 B2 6/2018 Davis et al.
9,988,923 B2 6/2018 Snyder et al.
10,012,099 B2 7/2018 Cetel et al.
10,024,193 B2 7/2018 Shapiro
10,072,517 B2 9/2018 Boeke et al.
10,082,085 B2 9/2018 Thomas et al.
10,087,771 B2 10/2018 Mcgarrah
10,100,660 B2 * 10/2018 Sippel ..................... F01D 11/08
10,132,197 B2 11/2018 Heitman et al.
10,138,747 B2 11/2018 Dev et al.
10,138,750 B2 11/2018 Mccaffrey et al.
10,167,957 B2 1/2019 Davis et al.
10,202,863 B2 2/2019 Davis et al.
10,265,806 B2 4/2019 Cui et al.
10,281,045 B2 5/2019 Sippel et al.
10,301,955 B2 * 5/2019 Vetters ................... F16J 15/022
10,301,960 B2 5/2019 Stapleton et al.
10,378,385 B2 8/2019 Tesson et al.
10,378,386 B2 8/2019 Roussille et al.
10,415,426 B2 9/2019 Quennehen et al.
10,415,427 B2 9/2019 Quennehen et al.
10,422,241 B2 9/2019 Mccaffrey et al.
10,428,688 B2 10/2019 Quennehen et al.
10,428,953 B2 10/2019 Lutjen et al.
10,443,419 B2 10/2019 Thomas et al.
10,443,420 B2 * 10/2019 Sippel .................... F16J 15/062
10,465,545 B2 11/2019 Cetel et al.
10,533,446 B2 1/2020 Barak et al.
10,550,706 B2 2/2020 Lutjen et al.
10,577,963 B2 3/2020 Mccaffrey
10,577,977 B2 3/2020 Baucco
10,584,605 B2 3/2020 Sippel et al.
10,590,803 B2 3/2020 Quennehen et al.
10,598,045 B2 3/2020 Tableau et al.
10,605,120 B2 3/2020 Quennehen et al.
10,619,517 B2 4/2020 Quennehen et al.
10,626,745 B2 4/2020 Roussille et al.
10,633,994 B2 4/2020 Barker
10,648,362 B2 5/2020 Groves, II et al.
10,655,495 B2 5/2020 Groves, II et al.
10,655,501 B2 5/2020 Lepretre et al.
10,662,794 B2 5/2020 Das
10,689,998 B2 * 6/2020 Stapleton ................ F01D 11/08
10,690,007 B2 6/2020 Quennehen et al.
10,704,404 B2 7/2020 Shi et al.
10,718,226 B2 7/2020 Vetters et al.
10,724,399 B2 7/2020 Carlin et al.
10,731,494 B2 8/2020 Dev et al.
10,731,509 B2 8/2020 Correia et al.
10,738,643 B2 8/2020 Mccaffrey et al.
10,753,221 B2 8/2020 Barker et al.
10,787,924 B2 9/2020 Quennehen et al.
10,794,204 B2 10/2020 Fitzpatrick et al.
10,801,345 B2 10/2020 Clum et al.
10,801,349 B2 10/2020 Mccaffrey
10,815,807 B2 10/2020 Vantassel et al.
10,815,810 B2 10/2020 Barker et al.
10,830,357 B2 11/2020 Mccaffrey et al.
10,890,079 B2 1/2021 Propheter-Hinckley et al.
10,907,487 B2 2/2021 Zurmehly et al.
10,907,501 B2 2/2021 Filippi et al.
10,934,872 B2 3/2021 Tableau et al.
10,934,873 B2 3/2021 Sarawate et al.
10,968,761 B2 4/2021 Barker et al.
10,968,777 B2 4/2021 Propheter-Hinckley et al.
10,982,559 B2 4/2021 Filippi
11,002,144 B2 5/2021 Azad et al.
11,015,613 B2 5/2021 Kerns et al.
11,021,988 B2 * 6/2021 Tableau .................... F23R 3/60
11,021,990 B2 6/2021 Filippi
11,028,720 B2 6/2021 Tableau et al.
11,041,399 B2 6/2021 Lutjen et al.
11,047,245 B2 6/2021 Mccaffrey
11,066,947 B2 7/2021 Sippel et al.
11,073,045 B2 7/2021 Sippel et al.
11,078,804 B2 8/2021 Tableau et al.
11,085,316 B2 8/2021 Barker et al.
11,085,317 B2 8/2021 Johnson et al.
11,105,215 B2 8/2021 Roy Thill et al.
11,111,794 B2 9/2021 Bitzko et al.
11,111,802 B2 9/2021 Propheter-Hinckley et al.
11,111,822 B2 * 9/2021 Tableau ................ F01D 25/246
11,111,823 B2 9/2021 Jarrossay et al.
11,125,096 B2 9/2021 Clark et al.
11,125,098 B2 9/2021 Barker et al.
11,143,050 B2 10/2021 Roy Thill et al.
11,149,574 B2 10/2021 Laroche
11,174,747 B2 11/2021 Roy Thill et al.
11,174,795 B2 11/2021 Lutjen et al.
11,181,006 B2 11/2021 Smoke et al.
11,187,094 B2 11/2021 Feldmann et al.
11,215,064 B2 1/2022 Arbona et al.
11,215,065 B2 1/2022 Starr et al.
11,215,081 B2 1/2022 Schilling et al.
11,248,480 B2 2/2022 Thirumalai et al.
11,255,208 B2 2/2022 Clark et al.
11,255,209 B2 2/2022 Clark et al.
11,286,812 B1 * 3/2022 Freeman ............... F01D 25/243
11,313,242 B2 4/2022 Cetel et al.
11,319,827 B2 5/2022 Clark et al.
11,319,828 B1 * 5/2022 Freeman ............... F01D 25/246
11,326,463 B2 5/2022 Blaney et al.
11,326,470 B2 5/2022 Dyson et al.
11,346,237 B1 * 5/2022 Freeman ................. F01D 11/08
11,346,251 B1 * 5/2022 Freeman ............... F01D 11/005
11,365,635 B2 6/2022 Read et al.
11,441,434 B2 9/2022 Danis et al.
11,441,441 B1 9/2022 Freeman et al.
11,466,585 B2 10/2022 Arbona et al.
11,466,586 B2 10/2022 Sippel et al.
11,499,444 B1 * 11/2022 Freeman ................. F01D 11/08
11,506,085 B2 11/2022 Jarrossay et al.
11,542,825 B2 1/2023 Hauswirth et al.
11,542,827 B2 1/2023 Quennehen et al.
11,624,291 B2 4/2023 Roy Thill et al.
11,624,292 B2 4/2023 Clark et al.
11,629,607 B2 4/2023 Freeman et al.
11,643,939 B2 5/2023 Stoyanov et al.
11,702,948 B2 7/2023 Hock et al.
11,702,949 B2 7/2023 Freeman et al.
11,713,694 B1 8/2023 Freeman et al.
11,732,604 B1 8/2023 Freeman et al.
11,761,351 B2 9/2023 Freeman et al.
11,773,751 B1 10/2023 Freeman et al.
11,781,440 B2 10/2023 Vincent et al.
11,781,448 B1 10/2023 Holleran
11,840,930 B2 12/2023 Propheter-Hinckley et al.
11,840,936 B1 12/2023 Freeman et al.
11,879,349 B2 1/2024 Schilling et al.
2016/0222812 A1 * 8/2016 Sippel ..................... F01D 11/12
2016/0348521 A1 * 12/2016 Sippel ................... F01D 11/005
2018/0195401 A1 * 7/2018 Sippel ................... F01D 11/005
2023/0184124 A1 6/2023 Stoyanov et al.

(56) References Cited

U.S. PATENT DOCUMENTS

| | | | |
|---|---|---|---|
| 2023/0332506 | A1 | 10/2023 | Freeman et al. |
| 2024/0003267 | A1 | 1/2024 | Cazin et al. |

* cited by examiner

TURBINE SHROUD SEGMENTS WITH DAMPING STRIP SEAL ASSEMBLIES

FIELD OF THE DISCLOSURE

The present disclosure relates generally to turbine shroud segments, and more specifically to sealing turbine shroud segments used with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such shrouds may include sealing elements between segments to block air from leaking through the segments during operation of the gas turbine engine.

SUMMARY

The present disclosure may comprise one or more of the following features and combinations thereof.

A turbine shroud assembly for use with a gas turbine engine may comprise a first shroud segment, a second shroud segment, and a damping strip seal assembly. The first shroud segment may include a first carrier segment and a first blade track segment. The first carrier segment may be arranged circumferentially at least partway around a central axis. The first blade track segment may be supported by the first carrier segment to define a portion of a gas path of the turbine shroud assembly. The first carrier segment may have a first outer wall, a first flange, a second flange, a third flange, and a fourth flange. The first flange may extend radially inward from the first outer wall. The second flange may be axially spaced apart from the first flange and may extend radially inward from the first outer wall. The third flange may extend radially inward from the first outer wall and may be located axially between the first flange and the second flange. The fourth flange may extend radially inward from the first outer wall and may be located axially between the third flange and the second flange.

In some embodiments, the second shroud segment may be arranged circumferentially adjacent the first shroud segment about the central axis. The second shroud segment may including a second carrier segment and a second blade track segment supported by the second carrier segment to define another portion of the gas path of the turbine shroud assembly. The damping strip seal assembly may extend circumferentially into the first shroud segment and the second shroud segment to block gases from passing radially between the first shroud segment and the second shroud segment. The damping strip seal assembly may include a body segment and a damping segment. The body segment may extend axially along a first radial outer surface of the first blade track segment and a second radial outer surface of the second blade track segment to block the gases from passing radially between the first shroud segment and the second shroud segment. The damping segment may extend along a curvilinear path and may engage the body segment and at least one of the first flange, the second flange, the third flange, and the fourth flange to urge the body segment of the damping strip seal assembly radially inward against the first blade track segment and the second blade track segment to dampen flutter movement of the body segment.

In some embodiments, the first flange of the first carrier segment may include a first wall and a first protrusion that extends radially inward from the first wall to cover a first axial end of the first blade track segment. The first wall may be formed to include a radial inward facing surface and a body-retaining slot may extend radially outward into the first flange from the radially inward facing surface to receive at least a portion of the body segment therein. The body segment may be formed to include an axially-extending portion and a radially-extending portion. The radially-extending portion may extend axially forward and radially outward from the axially-extending portion into a body-retaining slot formed in the first flange of the first carrier segment to retain the body segment axially relative to the first shroud segment.

In some embodiments, the damping segment may be formed to include a first radially-extending portion at a forward end of the damping segment and a second radially-extending portion at an aft end of the damping segment. The first radially-extending portion may extend into a first seal-retaining slot formed in the third flange to engage the third flange. The second radially-extending portion may extend into a second seal-retaining slot formed in the fourth flange to engage the fourth flange.

In some embodiments, the damping segment may be w-shaped and may include a curved intermediate portion that extends between and interconnects the first radially-extending portion and the second radially-extending portion. The damping segment may be u-shaped and may include an intermediate portion that extends between and interconnects the first radially-extending portion and the second radially-extending portion. The damping segment may be located axially between the first flange and the third flange. The damping segment may be formed to include a first radially-extending portion at a forward end of the damping segment and a second radially-extending portion at an aft end of the damping segment. The first radially-extending portion may abut an aft wall of the first flange. The second radially-extending portion may abut a forward wall of the third flange.

In some embodiments, the first blade track segment may include a first shroud wall, a first attachment flange, and a second attachment flange. The first shroud wall may extend circumferentially partway around the central axis. The first attachment flange may extend radially outward from the first shroud wall. The second attachment flange may extend radially outward from the first shroud wall axially aft of the first attachment flange. The damping segment may be w-shaped and may include a first portion that extends into a space between the first flange and the third flange, a second portion that extends into the second attachment flange, and an intermediate portion that extends between and interconnects the first portion and the second portion. The intermediate portion may be located between the third flange and the fourth flange.

In some embodiments, the damping segment may include a first radially-extending portion and a second radially-extending portion coupled with the first radially-extending portion at a radial peak of the damping segment. The first radially-extending portion and the second radially-extending portion may extend into a seal-retaining slot formed in the fourth flange to engage the fourth flange. The damping segment may be w-shaped and may include a first portion, a second portion, and an intermediate portion. The first portion may engage a radially inward facing surface of the third flange. The second portion may extend into the fourth flange. The intermediate portion may extend between and interconnect the first portion and the second portion and may be located axially between the third flange and the fourth flange.

In some embodiments, the first blade track segment may include a first shroud wall that extends circumferentially partway around the central axis and a first attachment feature that extends radially outward from the first shroud wall. A circumferential end of the first shroud wall may be formed with a first recess to define a first shoulder that may provide the first radial outer surface of the first blade track segment. The second blade track segment may include a second shroud wall that extends circumferentially partway around the central axis and a second attachment feature that extends radially outward from the second shroud wall. A circumferential end of the second shroud wall may be formed with a second recess to define a second shoulder that may provide the second radial outer surface of the second blade track segment. The body segment of the damping strip seal assembly may engage the first shoulder and the second shoulder.

According to another aspect of the present disclosure, a turbine shroud assembly for use with a gas turbine engine may comprise a first shroud segment, a second shroud segment, and a damping strip seal assembly. The first shroud segment may include a first carrier segment and a first blade track segment. The first carrier segment may be arranged circumferentially at least partway around a central axis. The first blade track segment may be coupled with the first carrier segment to define a portion of a gas path of the turbine shroud assembly. The first carrier segment may have an outer wall, a first flange, a second flange, a third flange, and a fourth flange. The first flange may extend radially inward from the outer wall. The second flange may be axially spaced apart from the first flange and may extend radially inward from the outer wall. The third flange may extend radially inward from the outer wall and may be located axially between the first flange and the second flange. The fourth flange may extend radially inward from the outer wall and may be located axially between the third flange and the second flange. The second shroud segment may include a second carrier segment arranged circumferentially at least partway around a central axis and a second blade track segment supported by the second carrier segment.

In some embodiments, the damping strip seal assembly may include a body segment and a damping segment. The body segment may engage a radial outer surface of the first blade track segment. The damping segment may engage a radial outer surface of the body segment and at least one of the third flange and the fourth flange of the first carrier segment to urge the body segment radially inward toward the radial outer surface of the first blade track segment. The first flange of the first carrier segment may include a first wall and a first protrusion that extends radially inward from the first wall to cover a first axial end of the first blade track segment. The first wall may be formed to include a radial inward facing surface and a body-retaining slot may extend radially outward into the first flange from the radially inward facing surface to receive at least a portion of the body segment therein.

In some embodiments, the damping segment may be formed to include a first radially-extending portion at a forward end of the damping segment, a second radially-extending portion at an aft end of the damping segment, and an intermediate portion. The intermediate portion may extend between and interconnects the first radially-extending portion and the second radially-extending portion. The first radially-extending portion may extend into a first seal-retaining slot formed in the third flange to engage the third flange. The second radially-extending portion may extend into a second seal-retaining slot formed in the fourth flange to engage the fourth flange.

In some embodiments, the damping segment may be located axially between the first flange and the third flange. The damping segment may be formed to include a first radially-extending portion at a forward end of the damping segment and a second radially-extending portion at an aft end of the damping segment. The first radially-extending portion may abut an aft wall of the first flange and the second radially-extending portion may abut a forward wall of the third flange. The first blade track segment may include a shroud wall, a first attachment flange, and a second attachment flange. The shroud wall may extend circumferentially partway around the central axis. The first attachment flange may extend radially outward from the shroud wall. The second attachment flange may extend radially outward from the shroud wall axially aft of the first attachment flange. The damping segment may include a first portion that extends into a space between the first flange and the third flange, a second portion that extends into the second attachment flange, and an intermediate portion. The intermediate portion may extend between and interconnect the first portion and the second portion and may be located between the third flange and the fourth flange.

In some embodiments, the damping segment may include a first radially-extending portion and a second radially-extending portion coupled with the first radially-extending portion at a radial peak of the damping segment. The first radially-extending portion and the second radially-extending portion may extend into a seal-retaining slot formed in the fourth flange to engage the fourth flange.

A method of assembling a turbine shroud assembly for use with a gas turbine engine may comprise assembling a first shroud segment by coupling a first blade track segment with a first carrier segment to support the first blade track segment radially inward of the first carrier segment. The first carrier segment may have an outer wall, a first flange, a second flange, a third flange, and a fourth flange. The first flange may extend radially inward from the outer wall. The second flange may be axially spaced apart from the first flange and may extend radially inward from the outer wall. The third flange may extend radially inward from the outer wall and may be located axially between the first flange and the second flange. The fourth flange may extend radially inward from the outer wall and may be located axially between the third flange and the second flange. The method may include assembling a second shroud segment by coupling a second blade track segment with a second carrier segment to support the second blade track segment radially inward of the second carrier segment.

In some embodiments, the method may include providing a damping strip seal assembly that includes a body segment and a damping segment. The method may include locating the body segment of the damping strip seal assembly on a first radial outer surface of the first blade track segment. The method may include sliding the damping segment onto a radial outer surface of the body segment and axially between the first flange and the second flange so that the damping segment engages at least one of the first flange, the second flange, the third flange, and the fourth flange.

In some embodiments, the method may include locating a radially-extending portion of the damping segment in a seal-retaining slot formed in the fourth flange so that the radially-extending portion engages the fourth flange. The method may include urging the body segment of the damping strip seal assembly radially inward against the first blade track segment and the second blade track segment through engagement of the damping segment with the at least one of the first flange, the second flange, the third flange, and the fourth flange.

These and other features of the present disclosure will become more apparent from the following description of the illustrative embodiments.

DETAILED DESCRIPTION

Figure 1:
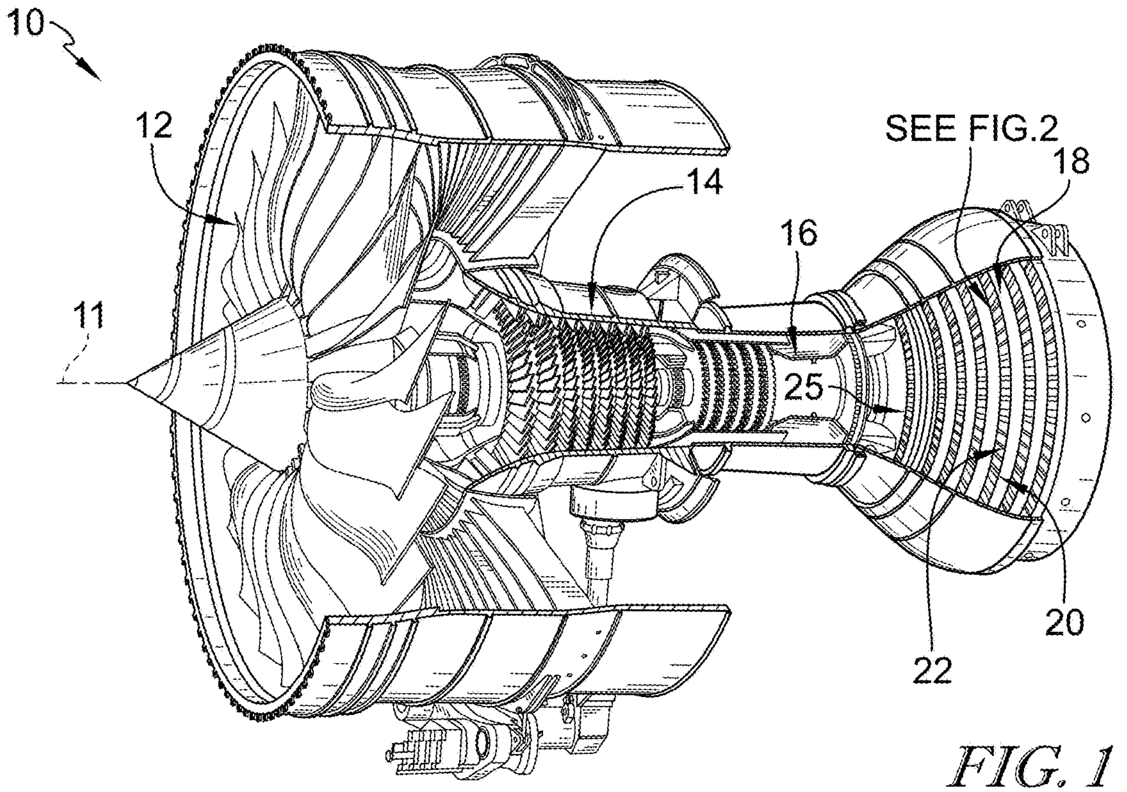
FIG. 1 is a cutaway perspective view of a gas turbine engine that includes a fan, a compressor, a combustor, and a turbine, the turbine including a turbine shroud assembly that extends circumferentially around an axis of the gas turbine engine and turbine wheel assemblies that are driven to rotate about the axis to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan 12 may be replaced with a propeller, drive shaft, or other suitable configuration.

Figure 2:
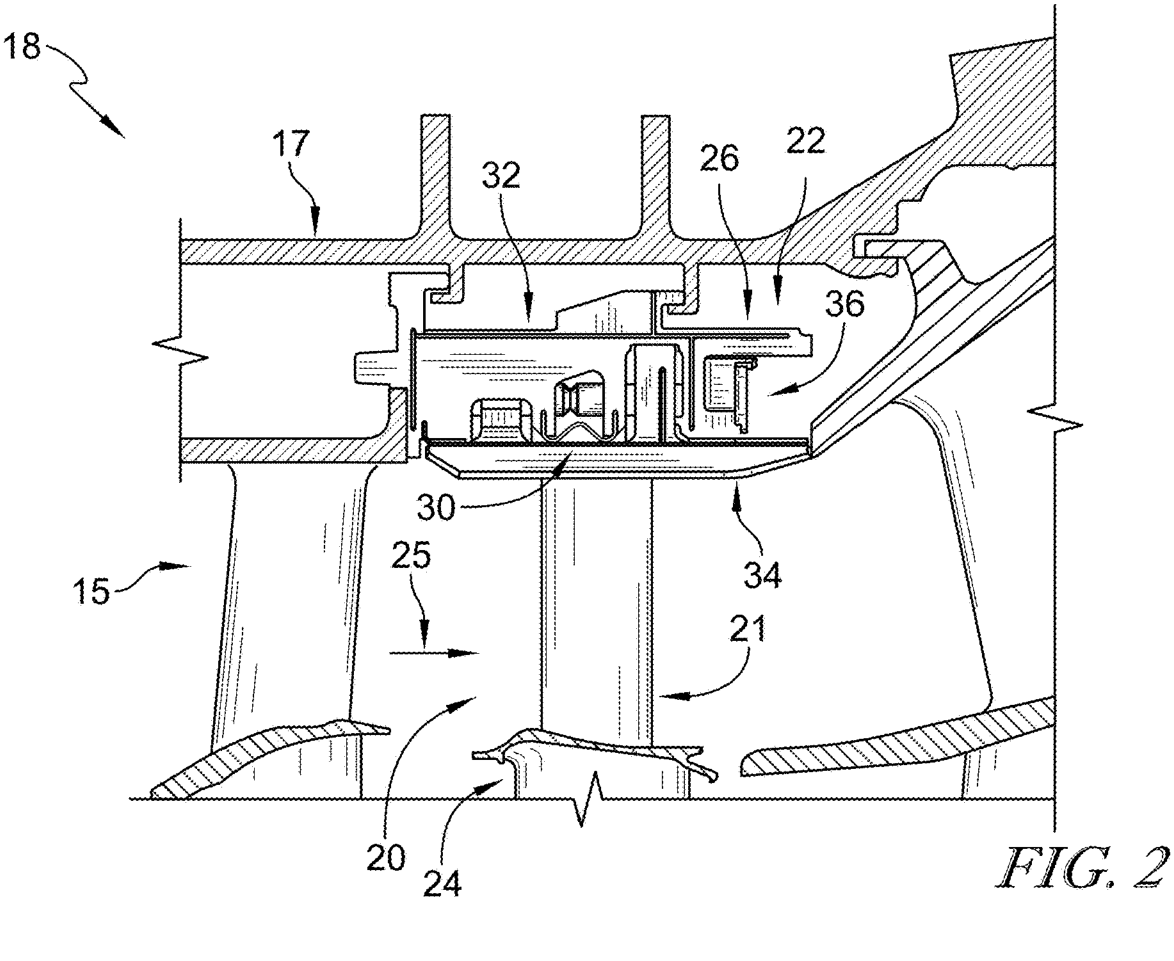
FIG. 2 is a cutaway perspective view of a portion of the turbine shroud assembly of FIG. 1 showing one of the turbine wheel assemblies and a first shroud segment of a plurality of shroud segments arranged around the turbine wheel assembly, the first shroud segment including a first carrier segment, a first blade track segment that defines a portion of a gas path of the turbine, and a first retainer that couples the first blade track segment with the first carrier segment, and further showing that strip seals of the turbine shroud assembly extend circumferentially into the first shroud segment and engage a radial outer surface of the first blade track segment to block gases from passing between the first shroud segment and a circumferentially adjacent second shroud segment.

The turbine 18 includes at least one turbine wheel assembly 20 and a turbine shroud assembly 22 positioned to surround the turbine wheel assembly 20 as shown in FIGS. 1 and 2. The turbine wheel assembly 20 includes a plurality of blades 21 coupled to a rotor disk 24 for rotation with the rotor disk 24. The hot, high-pressure combustion products from the combustor 16 are directed toward the blades 21 of the turbine wheel assemblies 20 along a gas path 25. The turbine wheel assembly 20 further includes a plurality of vanes 15 as shown in FIG. 2. The turbine shroud assembly 22 is coupled to an outer case 17 of the gas turbine engine 10 and extends around the turbine wheel assembly 20 to block gases from passing over the blades 21 during use of the turbine 18 in the gas turbine engine 10.

Figure 4:
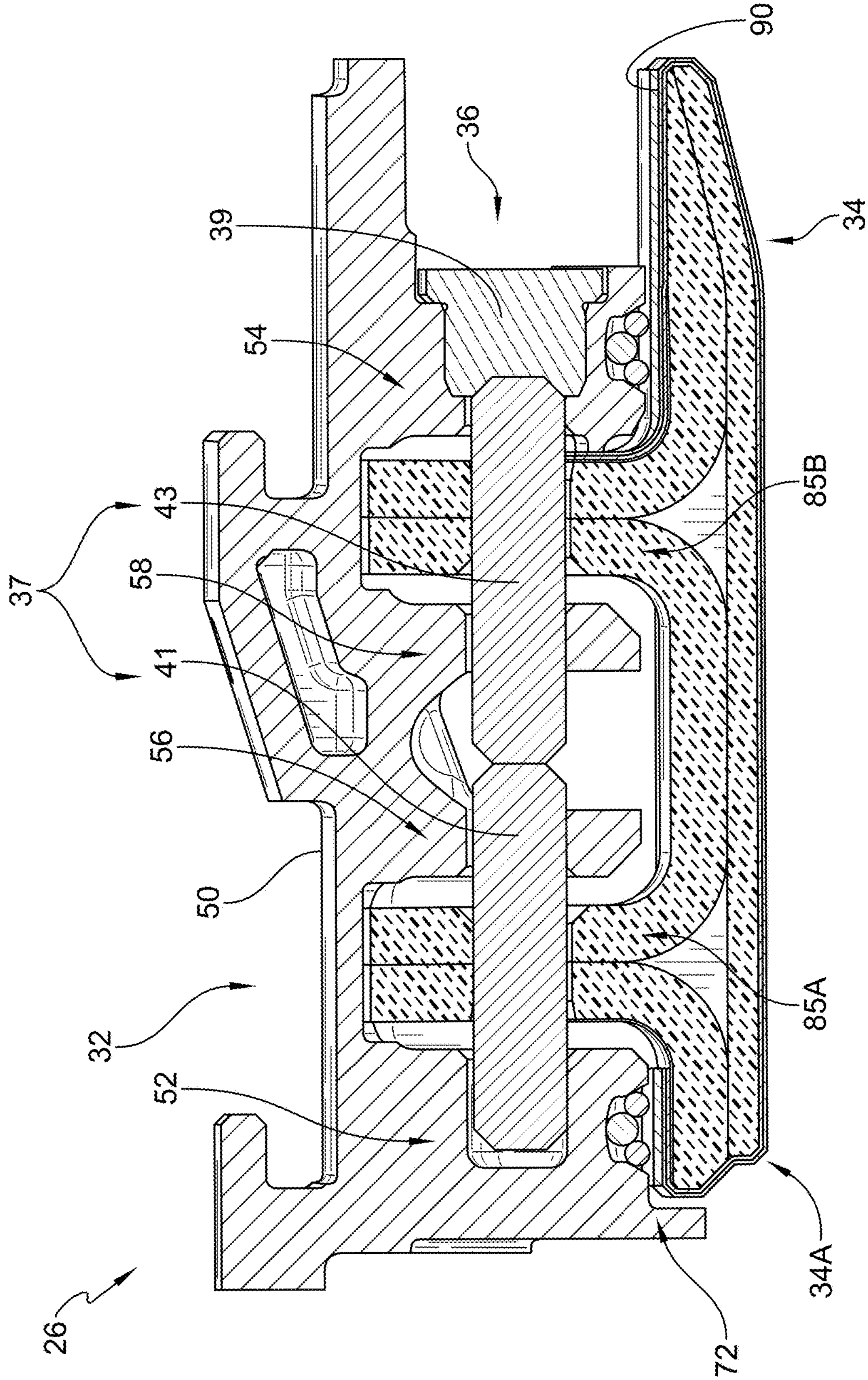
FIG. 4 is a cross-sectional view of the turbine shroud assembly of FIG. 3 showing that the first retainer extends through the first blade track segment and through each of the flanges of the first carrier segment to couple the first blade track segment to the first carrier segment.
Figure 5:
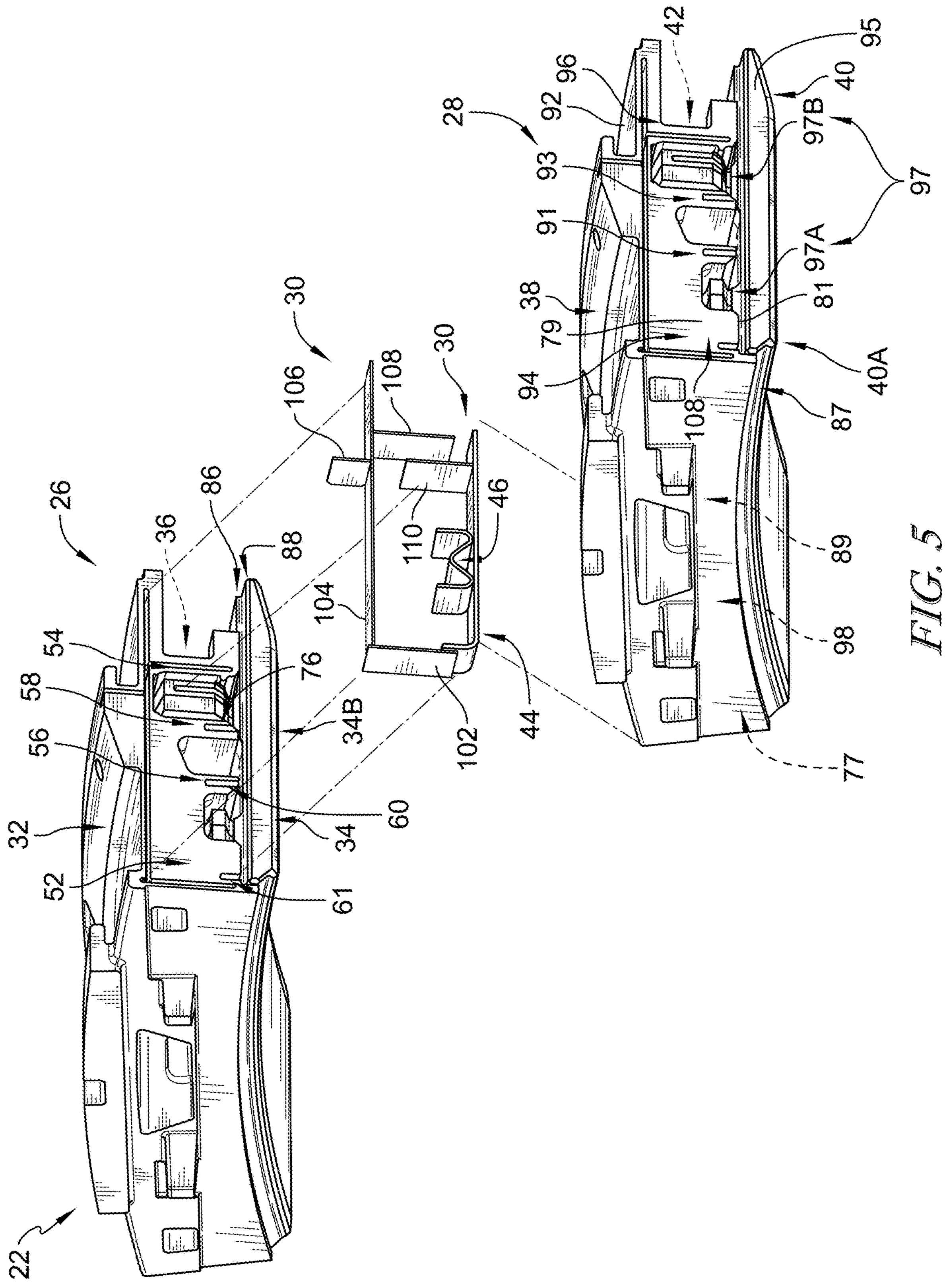
FIG. 5 is an exploded view of the first and second shroud segments used in the gas turbine engine of FIG. 1 showing the first shroud segment and the second shroud segment spaced apart from the first shroud segment, the second shroud segment including a second carrier segment and a second blade track segment supported by the second carrier segment, and further suggesting that the damping strip seal assembly extends circumferentially into the first shroud segment and the second shroud segment to block gases from passing between the first shroud segment and the second shroud segment.

The turbine shroud assembly 22 includes a plurality of shroud segments and a plurality of strip seals between adjacent shroud segments as suggested in FIGS. 2 and 5. Of the plurality of shroud segments, a first shroud segment 26 and a second shroud segment 28 are discussed in detail below. Likewise, a damping strip seal assembly 30 included in the plurality of strip seals used in the turbine shroud assembly 22 is shown in FIGS. 2-5. The first shroud segment 26, the second shroud segment 28, and the damping strip seal assembly 30 are representative of other adjacent shroud segments included in the turbine shroud assembly 22.

Figure 3:
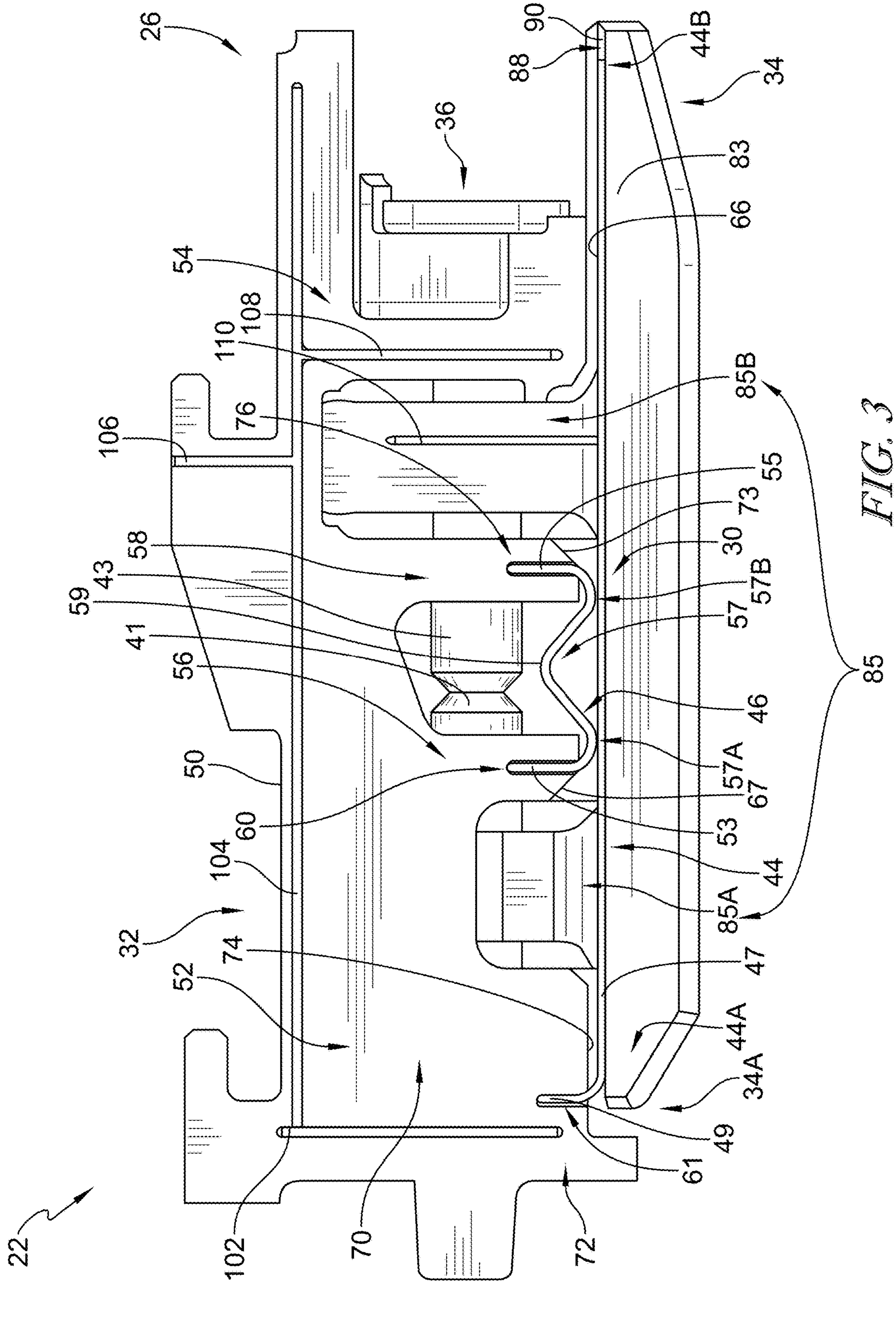
FIG. 3 is a side elevation view of the turbine shroud assembly of FIG. 2 showing that the first carrier segment includes a first outer wall and four flanges that extend radially inward from the first outer wall, the four flanges including, from fore to aft, a first flange, a third flange, a fourth flange, and a second flange, and further showing that the strip seals include a damping strip seal assembly that includes a body segment that extends axially along the radial outer surface of the first blade track segment and a w-shaped damping segment that engages the body segment and extends into both of the third flange and the fourth flange to urge the body segment radially inward against the first blade track segment to dampen flutter movement of the body segment relative to the first shroud segment.

The plurality of strip seals in the illustrative embodiment includes strip seals 102, 104, 106, 108, 110 as shown in FIGS. 3 and 5. Any of the strip seals 102, 104, 106, 108, 110 may be included or omitted from the plurality of strip seals. The strip seals 102, 104, 106, 108, 110 are representative of more conventional strip seals. The damping strip seal assembly 30 includes a damping segment 46 that urges the damping strip seal assembly 30 radially inward as suggested in FIG. 3.

Figure 7:
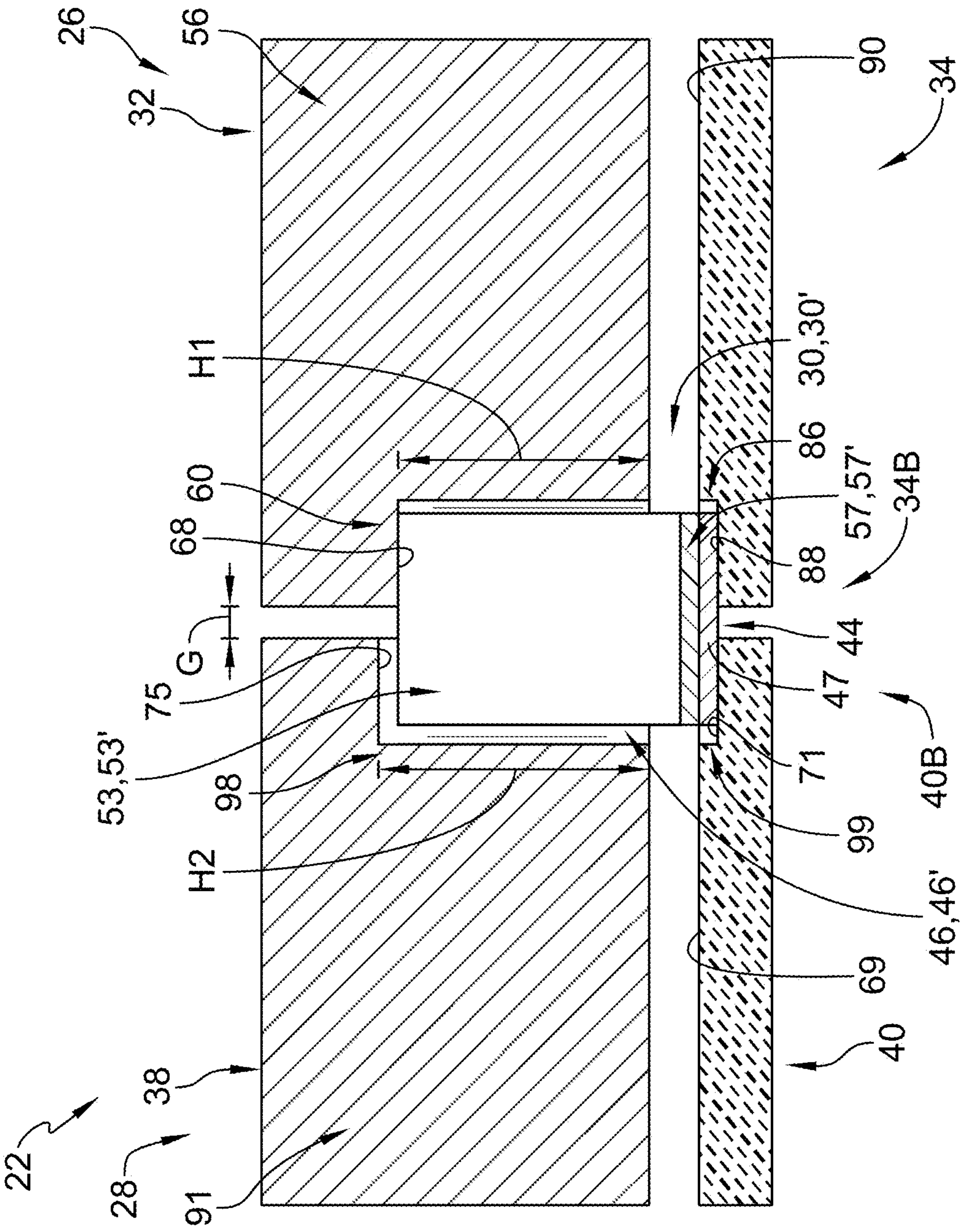
FIG. 7 is a cross-sectional diagrammatic view through the first and second shroud segments as assembled in the turbine shroud assembly of FIG. 1 showing that the first shroud segment and the second shroud segment are assembled adjacent one another and the body segment extends circumferentially between the first shroud segment and the second shroud segment, and further showing that the damping segment extends into a first seal-retaining slot formed in the third flange of the first carrier segment and a second seal-retaining slot formed in a seventh flange of the second carrier segment to engage the first seal-retaining slot without engaging the second seal-retaining slot due to height differences between the two slots.

The second shroud segment 28 is arranged circumferentially adjacent the first shroud segment 26 about the central axis 11. A circumferential gap G is formed between the first shroud segment 26 and the second shroud segment 28 as shown in FIG. 7. Though the turbine shroud assembly 22 is shown and described as having two shroud segments 26, 28 and one damping strip seal assembly 30, the turbine shroud assembly 22 includes additional shroud segments and damping strip seal assemblies so that the turbine shroud assembly 22 extends entirely circumferentially about the central axis 11 as suggested in FIG. 1.

The first shroud segment 26 includes a first carrier segment 32, a first blade track segment 34, and a first retainer 36 as shown in FIGS. 3 and 4. The first carrier segment 32 is arranged circumferentially at least partway around the central axis 11 and is coupled with the outer case 17 with hook features in the illustrative embodiment. The first blade track segment 34 is supported by the first carrier segment 32 to define a portion of the gas path 25. The first retainer 36 extends axially through the first carrier segment 32 and the first blade track segment 34 to couple the first carrier segment 32 and the first blade track segment 34 together.

The second shroud segment 28 includes a second carrier segment 38, a second blade track segment 40, and a second retainer 42 as shown in FIG. 5. The second carrier segment 38 is arranged circumferentially at least partway around the central axis 11 and is coupled with the outer case 17 with hook features in the illustrative embodiment. The second blade track segment 40 is supported by the second carrier segment 38 to define another portion of the gas path 25. The second retainer 42 extends axially through the second carrier segment 38 and the second blade track segment 40 to couple the second carrier segment 38 and the second blade track segment 40 together.

The damping strip seal assembly 30 extends circumferentially into the first shroud segment 26 and the second shroud segment 28 as shown in FIG. 7 and as suggested in FIG. 5. The damping strip seal assembly 30, along with the other strip seals 102, 104, 106, 108, 110, blocks gases in the gas path 25 from passing radially outward and circumferentially between the first shroud segment 26 and the second shroud segment 28 through the circumferential gap G.

Fluttering of strip seals may be a concern in turbine shroud assemblies. Fluttering movement of a strip seal may reduce the life of the strip seal. To minimize fluttering, and thus, reduce the possibility of failure, the damping strip seal assembly 30 of the present disclosure is urged radially against the blade track segments 34, 40 to dampen any flutter or vibration.

The damping strip seal assembly 30 includes a body segment 44 and a damping segment 46 as shown in FIG. 3. The body segment 44 extends axially along the first blade track segment 34 and the second blade track segment 40 as shown in FIG. 7. The damping segment 46 engages the first carrier segment 32 to urge the body segment 44 of the damping strip seal assembly 30 radially inward against the first blade track segment 34 and the second blade track segment 40. The urging of the body segment 44 against the first blade track segment 34 and the second blade track segment 40 dampens flutter movement of the damping strip seal assembly 30 relative to the first blade track segment 34 and the second blade track segment 40 during use of the turbine shroud assembly 22.

Turning back to the first shroud segment 26, the first carrier segment 32 of the first shroud segment 26 includes a first outer wall 50, a first flange 52, and a second flange 54 as shown in FIG. 3. The first flange 52 extends radially inward from the first outer wall 50. The second flange 54 is axially spaced apart from the first flange 52 and extends radially inward from the first outer wall 50.

The first flange 52 is formed to include a first body-retaining slot 61 as shown in FIG. 3. The first body-retaining slot 61 extends circumferentially into the first flange 52 and is shaped to receive a portion of the body segment 44 therein.

The first flange 52 of the first carrier segment 32 includes a first wall 70 formed to include a radially inward facing surface 74 as shown in FIG. 3. The first body-retaining slot 61 extends axially forward and radially outward into the first flange 52 from the radially inward facing surface 74 to match the curvature of the portion of the body segment 44 that extends into the first body-retaining slot 61. A first protrusion 72 extends radially inward from the first wall 70 axially forward of the first body-retaining slot 61. The first protrusion 72 is located axially forward of the first blade track segment 34 to cover an axial forward end 34A of the first blade track segment 34. The first protrusion 72 blocks at least a portion of the gases flowing through the gas path 25 from flowing axially into the body segment 44 of the damping strip seal assembly 30.

The first carrier segment 32 further includes a third flange 56 and a fourth flange 58 as shown in FIG. 3. Each of the third flange 56 and the fourth flange 58 extends radially inward from the first outer wall 50. The third flange 56 is located axially between the first flange 52 and the fourth flange 58. The fourth flange 58 is located axially between the third flange 56 and the second flange 54.

The third flange 56 of the first carrier segment 32 is formed to include a first seal-retaining slot 60 as shown in FIGS. 3 and 7. The first seal-retaining slot 60 extends radially outward into the third flange 56 from a radially inward facing surface 67 of the third flange 56. The first seal-retaining slot 60 receives a portion of the damping segment 46 therein as shown in FIG. 3. In some embodiments, the first seal-retaining slot 60 extends straight radially outward from the radially inward facing surface 67. In some embodiments, the first seal-retaining slot 60 extends axially forward and radially outward from the radially inward facing surface 67 to match the curvature of the portion of the damping segment 46 that is received therein. The first seal-retaining slot 60 has a first height H1 as shown in FIG. 7.

The fourth flange 58 of the first carrier segment 32 is formed to include a second seal-retaining slot 76 as shown in FIGS. 3 and 5. The second seal-retaining slot 76 extends radially outward into the fourth flange 58 from a radially inward facing surface 73 of the fourth flange 58. The second seal-retaining slot 76 receives a portion of the damping segment 46 therein as shown in FIG. 3. In some embodiments, the second seal-retaining slot 76 extends straight radially outward from the radially inward facing surface 73. In some embodiments, the second seal-retaining slot 76 extends axially aft and radially outward from the radially inward facing surface 73 to match the curvature of the portion of the damping segment 46 that is received therein. The second seal-retaining slot 76 has the first height H1. Each of the flanges 52, 54, 56, and 58 of the first carrier segment 32 is formed to include a hole that receives the first retainer 36 therein as shown in FIGS. 3 and 4. Illustratively, the first carrier segment 32 is made of metallic materials.

The first blade track segment 34 includes a first shroud wall 83 and a first attachment feature 85 that extends radially outward from the first shroud wall 83 as shown in FIGS. 3 and 4. The first shroud wall 83 extends circumferentially partway around the central axis 11. Illustratively, the first attachment feature 85 includes a first attachment flange 85A and a second attachment flange 85B axially aft of the first attachment flange 85A. Each of the attachment flanges 85A, 85B is formed to include a hole that receives the first retainer 36 therein. The first attachment flange 85A is located axially between the first flange 52 and the third flange 56 as shown in FIG. 3. The second attachment flange 85B is located axially between the fourth flange 58 and the second flange 54. Illustratively, the first blade track segment 34 is made of ceramic matrix composite materials.

A circumferential end 34B of the first shroud wall 83 confronts the second blade track segment 40 as shown in FIG. 7. The circumferential end 34B is formed with a first recess 86 that defines a first shoulder 88 of the first blade track segment 34 as shown in FIGS. 5 and 7. The first shroud wall 83 slopes radially inwardly at the circumferential end 34B to define the first shoulder 88. The first shroud wall 83 has a first radial outer surface 90 that faces toward the first carrier segment 32. The first radial outer surface 90 is formed on the first shoulder 88. The first radial outer surface 90 is exposed to air located radially between the first carrier segment 32 and the first blade track segment 34. The body segment 44 of the damping strip seal assembly 30 slides onto the first radial outer surface 90 of the first shoulder 88 as shown in FIG. 7.

In the illustrative embodiment, the first retainer 36 includes a mount pin 37 and a mount plug 39 as shown in FIG. 4. The first retainer 36 couples the first blade track segment 34 to the first carrier segment 32 as shown in FIGS. 3 and 4. The mount pin 37 extends through the first blade track segment 34 and into the first carrier segment 32. The mount plug 39 fits into the first carrier segment 32 axially aft of the mount pin 37 and circumferentially aligned with the mount pin 37.

In the illustrative embodiment, the mount pin 37 includes a forward pin 41 and an aft pin 43 as shown in FIG. 4. The forward pin 41 and the aft pin 43 of the mount pin 37 are circumferentially aligned. The forward pin 41 is located axially forward of the aft pin 43. In this embodiment, the forward pin 41 is separate from the aft pin 43 so as to allow for independent loading during use in the gas turbine engine 10. In some embodiments, the mount pin 37 is formed as a single pin. The mount pin 37 is inserted from an axially aft end of the first shroud segment 26. Though not shown, in the illustrative embodiment, an additional first retainer is included in the first shroud segment 26 spaced apart circumferentially from the first retainer 36 such that the first shroud segment 26 includes two forward pins 41, two aft pins 43, and two mount plugs 39.

The second carrier segment 38 of the second shroud segment 28 includes a second outer wall 92, a fifth flange 94, and a sixth flange 96 as shown in FIG. 5. The fifth flange 94 extends radially inward from the second outer wall 92. The sixth flange 96 is axially spaced apart from the fifth flange 94 and extends radially inward from the second outer wall 92.

The fifth flange 94 is formed to include a second body-retaining slot 77 as shown in FIG. 5. The second body-retaining slot 77 extends into the fifth flange 94 axially forward and radially outward to receive the portion of the body segment 44 therein. The first body-retaining slot 61 and the second body-retaining slot 77 are aligned with one another while the first shroud segment 26 and the second shroud segment 28 are assembled adjacent one another.

The fifth flange 94 of the second carrier segment 38 includes a second wall 79 formed to include a radially inward facing surface 81 as shown in FIG. 5. The second body-retaining slot 77 extends radially outward into the fifth flange 94 from the radially inward facing surface 81. A second protrusion 87 extends radially inward from the second wall 79 to cover an axial forward end 40A of the second blade track segment 40.

The second carrier segment 38 further includes a seventh flange 91 and an eighth flange 93 as shown in FIG. 5. Each of the seventh flange 91 and the eighth flange 93 extend radially inward from the second outer wall 92. The seventh flange 91 is located axially between the fifth flange 94 and the eighth flange 93. The eighth flange 93 is located axially between the seventh flange 91 and the sixth flange 96. The seventh and eighth flanges 91, 93 may be inner flanges or clevises that are both located axially inward of the fifth flange 94 and the sixth flange 96.

The seventh flange 91 of the second carrier segment 38 is formed to include a third seal-retaining slot 98 as shown in FIG. 7. The third seal-retaining slot 98 extends radially outward into the seventh flange 91. The third seal-retaining slot 98 has a second height H2 as shown in FIG. 7. The third seal-retaining slot 98 is similar to the first seal-retaining slot 60 except that the third seal-retaining slot 98 has the second height H2.

The eighth flange 93 of the second carrier segment 38 is formed to include a fourth seal-retaining slot 89 as shown in FIG. 5. The fourth seal-retaining slot 89 extends radially outward into the eighth flange 93. The fourth seal-retaining slot 89 has the second height H2. The fourth seal-retaining slot 89 is similar to the second seal-retaining slot 76 except that the fourth seal-retaining slot 89 has the second height H2.

The first seal-retaining slot 60 and the third seal-retaining slot 98 are aligned with one another while the first shroud segment 26 and the second shroud segment 28 are assembled adjacent to one another as shown in FIG. 7. The second seal-retaining slot 76 and the fourth seal-retaining slot 89 are aligned with one another while the first shroud segment 26 and the second shroud segment 28 are assembled adjacent to one another. In the illustrative embodiment, the second height H2 of the third seal-retaining slot 98 and the fourth seal-retaining slot 89 is greater than the first height H1 of the first seal-retaining slot 60 and the second seal-retaining slot 76. Each of the flanges 94, 96, 91, and 93 of the second carrier segment 38 is formed to include a hole that receives the second retainer 42 therein.

The second blade track segment 40 includes a second shroud wall 95 and a second attachment feature 97 that extends radially outward from the second shroud wall 95 as shown in FIG. 5. The second shroud wall 95 extends circumferentially partway around the central axis 11. Illustratively, the second attachment feature 97 includes a third attachment flange 97A and a fourth attachment flange 97B axially aft of the third attachment flange 97A. Each of the attachment flanges 97A, 97B is formed to include a hole that receives the second retainer 42 therein. The third attachment flange 97A is located axially between the fifth flange 94 and the seventh flange 91. The fourth attachment flange 97B is located axially between the eighth flange 93 and the sixth flange 96. Illustratively, the second blade track segment 40 is made of ceramic matrix composite materials.

A circumferential end 40B of the second shroud wall 95 confronts the first blade track segment 34 as shown in FIG. 7. The circumferential end 40B is formed with a second recess 99 that defines a second shoulder 71 of the second blade track segment 40. The second shroud wall 95 slopes radially inwardly at the circumferential end 40B to define the second shoulder 71. The second shroud wall 95 has a second radial outer surface 69 that faces toward the second carrier segment 38. The second radial outer surface 69 is formed on the second shoulder 71. The second radial outer surface 69 is exposed to air located radially between the second carrier segment 38 and the second blade track segment 40. The second retainer 42 is the same as the first retainer 36 such that description of the first retainer 36 also applies to the second retainer 42.

The damping strip seal assembly 30 includes the body segment 44 and the damping segment 46 shown in FIG. 3. In the illustrative embodiment, the body segment 44 and the damping segment 46 are separate components. The body segment 44 engages the first radial outer surface 90 of the first shoulder 88 and the second radial outer surface 69 of the second shoulder 71 as shown in FIG. 7. A radial inner surface of the body segment 44 directly contacts the radial outer surfaces 90, 69 of the blade track segments 34, 40. A radial outer surface 66 of the body segment 44 is exposed to air that is radially between the carrier segments 32, 38 and the blade track segments 34, 40. The body segment 44 extends axially along the first radial outer surface 90 of the first blade track segment 34 and the second radial outer surface 69 of the second blade track segment 40 and circumferentially between the blade track segments 34, 40 to block the circumferential gap G.

The body segment 44 is formed to include an axially-extending portion 47 and a radially-extending portion 49 as shown in FIG. 3. The axially-extending portion 47 is substantially flat relative to the central axis 11 and extends axially along the radial outer surfaces 90, 69 of the blade track segments 34, 40. In the illustrative embodiment, the axially-extending portion 47 is flush with the radial outer surfaces 90, 69 of the blade track segments 34, 40. The axially-extending portion 47 extends between a first axial end 44A and a second axial end 44B as shown in FIG. 3.

The radially-extending portion 49 turns relative to the axially-extending portion 47 at the first axial end 44A of the axially-extending portion 47 as shown in FIG. 3. The radially-extending portion 49 extends axially forward and radially outward from the axially-extending portion 47. At least a portion of the radially-extending portion 49 extends into the first body-retaining slot 61 formed in the first flange 52 of the first carrier segment 32. In some embodiments, at least a portion of the radially-extending portion 49 extends into the second body-retaining slot 77 formed in the fifth flange 94 of the second carrier segment 38. The radially-extending portion 49 extending into the first body-retaining slot 61 retains the body segment 44 axially relative to the first shroud segment 26 so that the body segment 44 does not slide fore and aft.

The first axial end 44A of the body segment 44 is at least partially axially aligned with the first flange 52 such that the radially-extending portion 49 extends into the first body-retaining slot 61 formed in the first flange 52 as shown in FIG. 3. The second axial end 44B of the body segment 44 is located axially aft of the second flange 54.

The first recess 86 of the first blade track segment 34 and the second recess 99 of the second blade track segment 40 retain the body segment 44 circumferentially between the first blade track segment 34 and the second blade track segment 40 as suggested in FIG. 7. The body segment 44 may slide circumferentially a marginal amount, however, the recesses 86, 99 block the body segment 44 from sliding such that the circumferential gap G is no longer blocked.

The damping segment 46 extends along a curvilinear path as shown in FIG. 3. The damping segment 46 engages the radial outer surface 66 of the body segment 44 and at least one of the first flange 52, the second flange 54, the third flange 56, and the fourth flange 58 of the first carrier segment 32 as shown in FIG. 3. In the illustrative embodiment, the curvilinear path forms a w-shape. The damping segment 46 is defined by a first radially-extending portion 53, a second radially-extending portion 55, and a curved intermediate portion 57 that extends between and interconnects the first radially-extending portion 53 and the second radially-extending portion 55. The first radially-extending portion 53 forms the forward-most end of the damping segment 46, and the second radially-extending portion 55 forms the aft-most end of the damping segment 46. The curved intermediate portion 57 extends between a forward end 57A and an aft end 57B.

The first radially-extending portion 53 extends axially forward and radially outward from the forward end 57A of the curved intermediate portion 57 and into the first seal-retaining slot 60 formed in the third flange 56 of the first carrier segment 32 as shown in FIG. 3. The second radially-extending portion 55 extends axially aft and radially outward from the aft end 57B of the curved intermediate portion 57 and into the second seal-retaining slot 76 formed in the fourth flange 58 of the first carrier segment 32. In the illustrative embodiment, the first radially-extending portion 53 and the second radially-extending portion 55 have the same height.

The curved intermediate portion 57, from the forward end 57A thereof, extends radially outward and axially aft to a peak 59 of the curved intermediate portion 57 as shown in FIG. 3. From the peak 59, the curved intermediate portion 57 extends radially inward and axially aft to the aft end 57B thereof. The peak 59 is located axially between the third flange 56 and the fourth flange 58. The forward end 57A and the aft end 57B of the curved intermediate portion 57 each engage the radial outer surface 66 of the body segment 44 as shown in FIG. 3.

The engagement between the first radially-extending portion 53 and the first seal-retaining slot 60 and the second radially-extending portion 55 and the second seal-retaining slot 76 applies a force to the body segment 44. The force urges the body segment 44 of the damping strip seal assembly 30 radially inward against the first and second radial outer surfaces 90, 69 of the blade track segments 34, 40.

The first radially-extending portion 53 extends into both of the first seal-retaining slot 60 of the first carrier segment 32 and the third seal-retaining slot 98 of the second carrier segment 38 as shown in FIG. 7. A radially outer end of the first radially-extending portion 53 contacts a topmost surface 68 of the first seal-retaining slot 60. Because of the height differences (H1 and H2) between the first and the third seal-retaining slots 60, 98, the first radially-extending portion 53 does not contact a topmost surface 75 of the third seal-retaining slot 98 as shown in FIG. 7.

The second radially-extending portion 55 is configured similarly to the first radially-extending portion 53. The second radially-extending portion 55 extends into both of the second seal-retaining slot 76 of the first carrier segment 32 and the fourth seal-retaining slot 89 of the second carrier segment 38. A radially outer end of the second radially-extending portion 55 contacts a topmost surface of the second seal-retaining slot 76. Because of the height differences (H1 and H2) between the second and the fourth seal-retaining slots 76, 89, the second radially-extending portion 55 does not contact a topmost surface of the fourth seal-retaining slot 89.

The seal-retaining slots 60, 98, 76, 89 retain the damping segment 46 axially and radially relative to the turbine shroud assembly 22 as suggested in FIG. 3. As shown in FIGS. 5 and 7, the body segment 44 and the damping segment 46 have substantially similar widths.

In some embodiments, the turbine shroud assembly 22 further includes strip seals 102, 104, 106, 108, 110 as shown in FIGS. 3 and 5. Each of the strip seals 102, 104, 106, 108 extends into the first carrier segment 32 and the second carrier segment 38. The strip seal 110 extends into each of the second attachment flange 85B of the first blade track segment 34 and the fourth attachment flange 97B of the second blade track segment 40.

The first carrier segment 32 and the second carrier segment 38 are each formed to include grooves sized to receive the strip seals 102, 104, 106, 108 therein as shown in FIGS. 3 and 5. The second attachment flange 85B of the first blade track segment 34 and the fourth attachment flange 97B of the second blade track segment 40 are each formed to include a groove sized to receive the strip seal 110 therein. The strip seals 102, 104, 106, 108, 110 provide additional sealing between the first shroud segment 26 and the second shroud segment 28.

Figure 6:
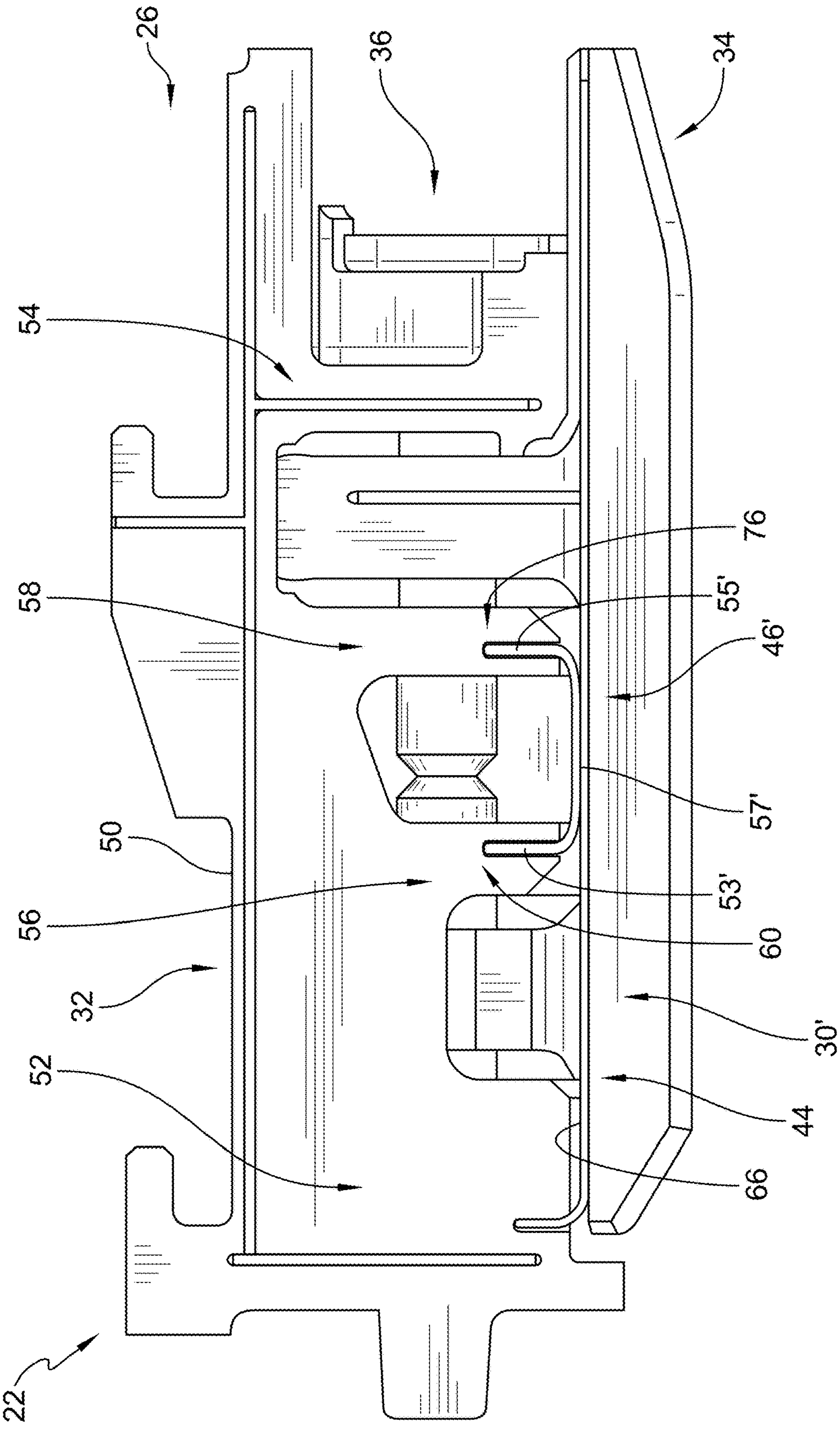
FIG. 6 is a side elevation view of another embodiment of a damping segment for use with the turbine shroud assembly of FIG. 3 showing that the u-shaped damping segment engages the body segment and extends into both of the third flange and the fourth flange to urge the body segment radially inward against the first blade track segment to dampen flutter movement of the body segment relative to the first shroud segment.

Another embodiment of a damping segment 46' in accordance with the present disclosure is shown in FIGS. 6 and 7. The damping segment 46' is substantially similar to the damping segment 46 shown in FIGS. 1-5 and described herein. Accordingly, similar reference numbers including a prime indicate features that are common between the damping segment 46' and the damping segment 46. The description of the damping segment 46 is incorporated by reference to apply to the damping segment 46', except in instances when it conflicts with the specific description and the drawings of the damping segment 46.

The damping segment 46' extends along a curvilinear path and engages the radial outer surface 66 of the body segment 44 and at least one of the first flange 52, the second flange 54, the third flange 56, and the fourth flange 58 of the first carrier segment 32 as shown in FIG. 6. In the illustrative embodiment, the curvilinear path forms a u-shape. The damping segment 46' is formed to include a first radially-extending portion 53', a second radially-extending portion 55', and an intermediate portion 57' that extends between and interconnects the first radially-extending portion 53' and the second radially-extending portion 55'.

The first radially-extending portion 53' extends axially forward and radially outward from a forward end of the intermediate portion 57' and into the first seal-retaining slot 60 formed in the third flange 56 of the first carrier segment 32 as shown in FIGS. 6 and 7. The second radially-extending portion 55' extends axially aft and radially outward from an aft end of the intermediate portion 57' and into the second seal-retaining slot 76 formed in the fourth flange 58 of the first carrier segment 32.

The intermediate portion 57' extends axially along and engages the radial outer surface 66 of the body segment 44 as shown in FIG. 6. The intermediate portion 57' is substantially flush with the body segment 44. The engagement between the first radially-extending portion 53' and the first seal-retaining slot 60 and the second radially-extending portion 55' and the second seal-retaining slot 76 urges the body segment 44 of the damping strip seal assembly 30' radially inward against the first and second radial outer surfaces 90, 69 of the blade track segments 34, 40.

Figure 8:
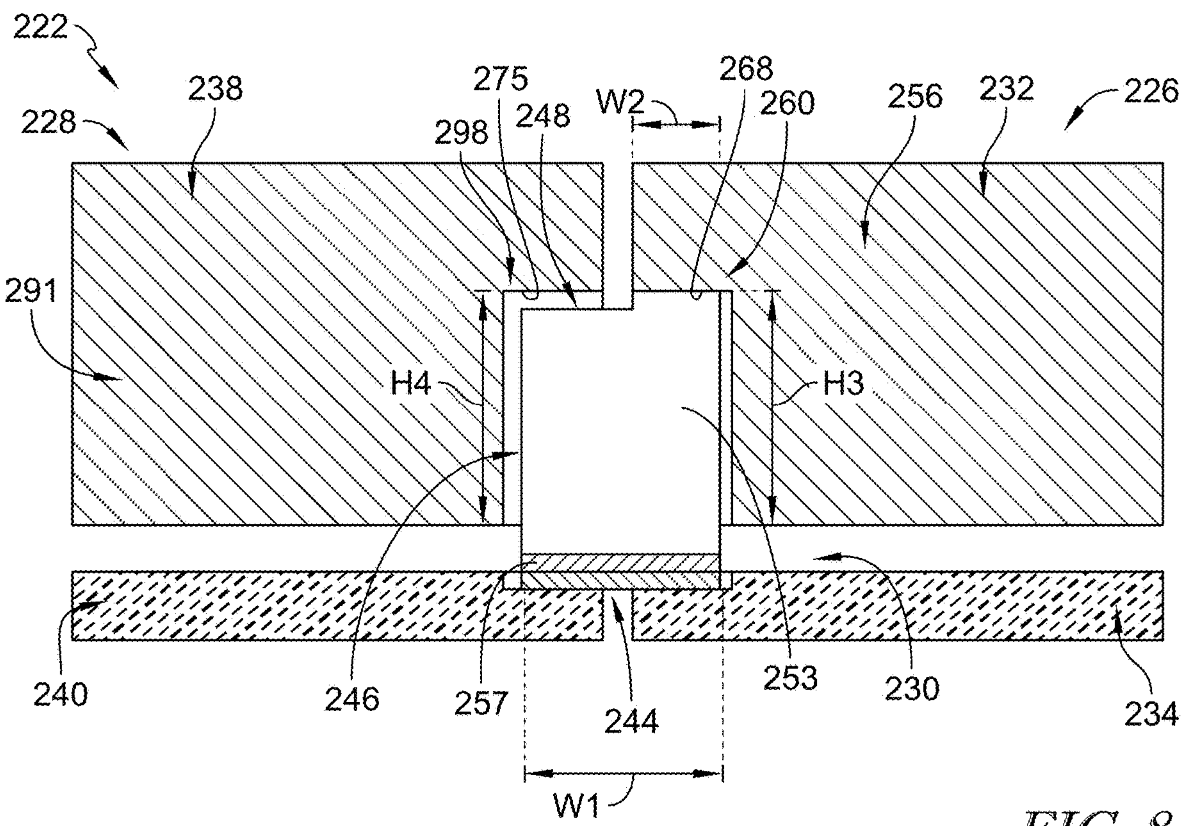
FIG. 8 is a diagrammatic section view of another embodiment of first and second shroud segments of a turbine shroud assembly for use in the gas turbine engine of FIG. 1 showing that a first carrier segment of the first shroud segment is formed to include a first seal-retaining slot in a third flange and a second carrier segment of the second shroud segment is formed to include a second seal-retaining slot in a seventh flange, the first seal-retaining slot and the second seal-retaining slot having substantially similar heights, and further showing that a damping segment of a damping strip seal assembly is formed to include a notch so that the damping segment extends into the first seal-retaining slot and the second seal-retaining slot to engage the first carrier segment without engaging the second carrier segment.

Another embodiment of a turbine shroud assembly 222 in accordance with the present disclosure is shown in FIG. 8. The turbine shroud assembly 222 is substantially similar to the turbine shroud assembly 22 shown in FIGS. 1-7 and described herein. Accordingly, similar reference numbers in the 200 series indicate features that are common between the turbine shroud assembly 22 and the turbine shroud assembly 222. The description of the turbine shroud assembly 22 is incorporated by reference to apply to the turbine shroud assembly 222, except in instances when it conflicts with the specific description and the drawings of the turbine shroud assembly 222.

As compared to the turbine shroud assembly 22, the turbine shroud assembly 222 includes a different third seal-retaining slot 298 formed in a second carrier segment 238 and a different damping segment 246 as shown in FIG. 8. The turbine shroud assembly 222 includes a first shroud segment 226, a second shroud segment 228, and a damping strip seal assembly 230.

The first shroud segment 226 includes a first carrier segment 232, a first blade track segment 234, and a first retainer (not shown, but the same as the first retainer 36) as shown in FIG. 8. The second shroud segment 228 includes a second carrier segment 238, a second blade track segment 240, and a second retainer (not shown, but the same as the second retainer 42). Illustratively, the first blade track segment 234 is the same as the first blade track segment 34, and the second blade track segment 240 is the same as the second blade track segment 40. The damping strip seal assembly 230 extends into the first shroud segment 226 and the second shroud segment 228. The damping strip seal assembly 230 includes a body segment 244 and a damping segment 246.

A third flange 254 of the first carrier segment 232 is formed to include a first seal-retaining slot 260 sized to receive at least a portion of the damping segment 246 therein as shown in FIG. 8. The first seal-retaining slot 260 has a third height H3. Illustratively, the first seal-retaining slot 260 is the same as the first seal-retaining slot 60. A fourth flange of the first carrier segment 232 is formed to include a second seal-retaining slot having the third height H3 (the same as the second seal-retaining slot 76).

A seventh flange 291 of the second carrier segment 238 is formed to include a third seal-retaining slot 298 as shown in FIG. 8. The third seal-retaining slot 298 has a fourth height H4. The third height H3 and the fourth height H4 are substantially equal. An eighth flange of the second carrier segment 238 is formed to include a fourth seal-retaining slot having the fourth height H4.

The body segment 244 is the same as the body segment 44. The body segment 244 has a first width W1 as shown in FIG. 8. The damping segment 246 may be shaped similarly to the damping segment 46 or the damping segment 46'. As compared to the damping segment 46, 46', the damping segment 246 is formed to include a notch 248 in a first radially-extending portion 253 and a second radially-extending portion of the damping segment 246. The notch 248 extends radially inwardly from a radial outer end of the first radially-extending portion 253 as shown in FIG. 8. The notch 248 extends at least partially into the first radially-extending portion 253 toward a curved intermediate portion 257 and the body segment 244. In other words, at least a portion of the first radially-extending portion 253 has a second width W2. The second width W2 is less than the first width W1 of the body segment 244 as shown in FIG. 8.

In some embodiments, the first radially-extending portion 253 extends into the first seal-retaining slot 260 and into the third seal-retaining slot 298 as shown in FIG. 8. The first radially-extending portion 253 contacts a topmost surface 268 of the first seal-retaining slot 260 without contacting a topmost surface 275 of the third seal-retaining slot 298. Though not shown, the second radially-extending portion is configured the same as the first radially-extending portion 253 such that the second radially-extending portion is formed to include a notch so that the second radially-extending portion only contacts the second seal-retaining slot of the first carrier segment 232 without contacting the fourth seal-retaining slot of the second carrier segment 238.

Figure 9:
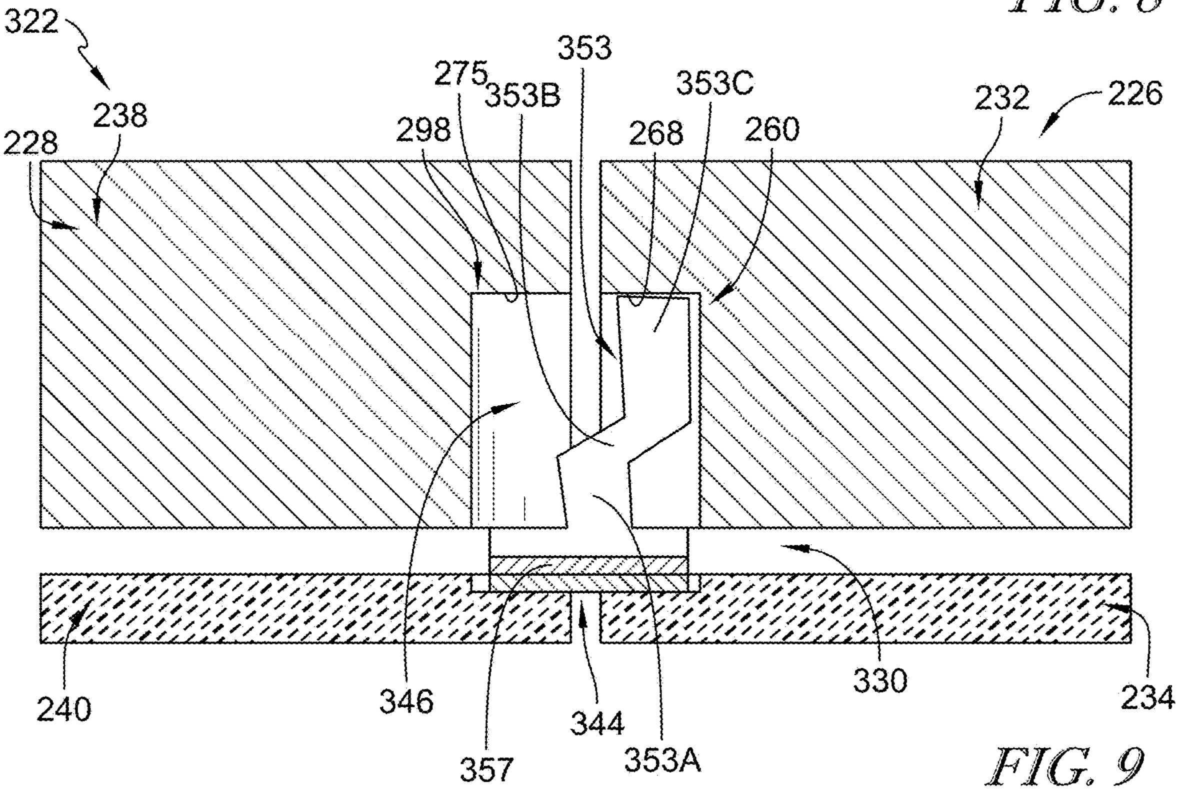
FIG. 9 is a diagrammatic section view of the first shroud segment and the second shroud segment of FIG. 8 including an alternative damping strip seal assembly, the damping strip seal assembly having a damping segment that extends into both of the first seal-retaining slot and the second seal-retaining slot while only engaging the first carrier segment.

Another embodiment of a damping strip seal assembly 330 for use with the first shroud segment 226 and the second shroud segment 228 of FIG. 8 is shown in FIG. 9. The damping strip seal assembly 330 is substantially similar to the damping strip seal assembly 30 shown in FIGS. 1-5 and described herein and the damping strip seal assembly 230 shown in FIG. 8 and described herein. Accordingly, similar reference numbers in the 300 series indicate features that are common between the damping strip seal assembly 30, the damping strip seal assembly 230, and the damping strip seal assembly 330. The descriptions of the damping strip seal assembly 30 and the damping strip seal assembly 230 are incorporated by reference to apply to the damping strip seal assembly 330, except in instances when it conflicts with the specific description and the drawings of the damping strip seal assembly 330.

The damping strip seal assembly 330 of a turbine shroud assembly 322 includes a body segment 344 and a damping segment 346 as shown in FIG. 9. The damping segment 346 includes a first radially-extending portion 353, a second radially-extending portion, and a curved intermediate portion 357 as described in relation to the damping segment 46, 46'. The first radially-extending portion 353 is formed to include a first radial portion 353A, a circumferential portion 353B, and a second radial portion 353C as shown in FIG. 9.

The first radial portion 353A extends radially outward away from the curved intermediate portion 357 as shown in FIG. 9. The circumferential portion 353B extends circumferentially relative to the first radial portion 353A. The circumferential portion 353B extends from the first radial portion 353A toward the first carrier segment 232. The second radial portion 353C extends radially outward from the circumferential portion 353B. The first radial portion 353A and the circumferential portion 353B extend into both of the first seal-retaining slot 260 and the third seal-retaining slot 298. The second radial portion 353C engages the topmost surface 268 of the first seal-retaining slot 260.

Illustratively, the second radial portion 353C extends into the first seal-retaining slot 260 without extending into the third seal-retaining slot 298 so that only the first carrier segment 232 is engaged by the second radial portion 353C as shown in FIG. 9. The first radially-extending portion 353 of the damping segment 346 contacts the topmost surface 268 of the first seal-retaining slot 260 without contacting the topmost surface 275 of the third seal-retaining slot 298.

Though not shown, the second radially-extending portion is configured similarly to the first radially-extending portion 353 such that the second radially-extending portion only contacts the second seal-retaining slot of the first carrier segment 232 without contacting the fourth seal-retaining slot of the second carrier segment 238. The first radially-extending portion 253 (and the second radially-extending portion) may have any shape that allows the first radially-extending portion 253 to extend into each of the slots 260, 298, while only engaging the first seal-retaining slot 260.

Figure 10A:
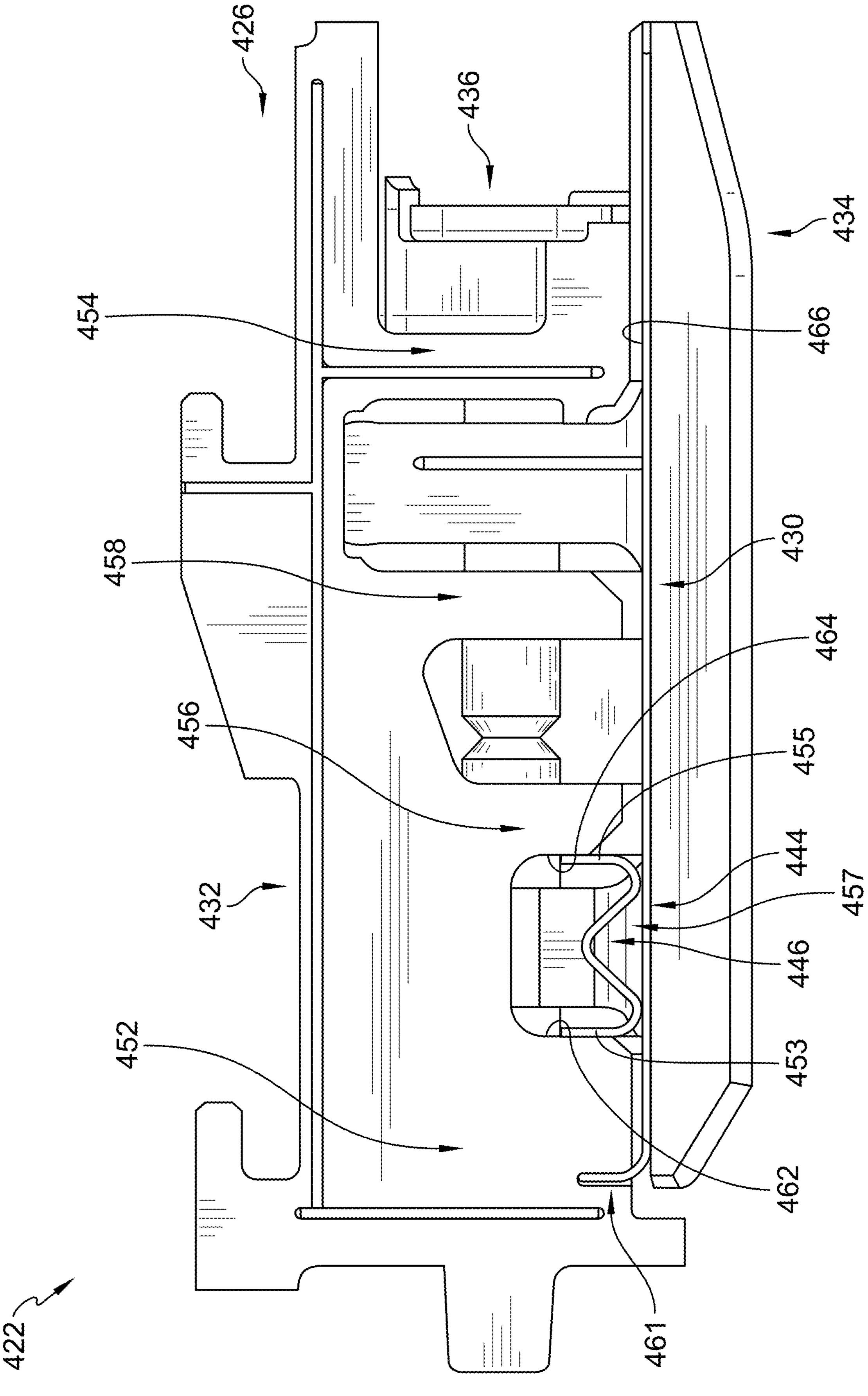
FIG. 10A is a side elevation view of another embodiment of a turbine shroud assembly for use in the gas turbine engine of FIG. 1 showing that the damping strip seal assembly includes a body segment that extends axially along a radial outer surface of a first blade track segment and a w-shaped damping segment that engages the body segment and is located axially between a first flange and a third flange of a first carrier segment to engage each of the flanges to urge the body segment radially inward against the first blade track segment to dampen flutter movement of the body segment.

Another embodiment of a turbine shroud assembly 422 in accordance with the present disclosure is shown in FIG. 10A. The turbine shroud assembly 422 is substantially similar to the turbine shroud assembly 22 shown in FIGS. 1-5 and described herein, the turbine shroud assembly 222 shown in FIG. 8 and described herein, and the turbine shroud assembly 322 shown in FIG. 9 and described herein. Accordingly, similar reference numbers in the 400 series indicate features that are common between the turbine shroud assembly 22, the turbine shroud assembly 222, the turbine shroud assembly 322, and the turbine shroud assembly 422. The descriptions of the turbine shroud assembly 22, the turbine shroud assembly 222, and the turbine shroud assembly 322 are incorporated by reference to apply to the turbine shroud assembly 422, except in instances when it conflicts with the specific description and the drawings of the turbine shroud assembly 422. The turbine shroud assembly 422, as compared to the turbine shroud assembly 22, does not include slots formed in flanges 456, 458 of a first carrier segment 432.

A first shroud segment 426 of the turbine shroud assembly 422 includes the first carrier segment 432, a first blade track segment 434, and a first retainer 436 as shown in FIG. 10A. The first blade track segment 434 is similar to the first blade track segment 34, and the first retainer 436 is similar to the first retainer 36. The first carrier segment 432 includes a first flange 452, a second flange 454, a third flange 456, and a fourth flange 458. The first flange 452 is formed to include a first body-retaining slot 461 that is similar is to the first body-retaining slot 61. In the illustrative embodiment, the third flange 456 and the fourth flange 458 are formed without seal-retaining slots.

A body segment 444 of a damping strip seal assembly 430 is similar to the body segment 44. The damping segment 446 extends along a curvilinear path and engages a radial outer surface 466 of the body segment 444 as shown in FIG. 10A. The damping segment 446 abuts each of the first flange 452 and the third flange 456. In the illustrative embodiment, the curvilinear path forms a w-shape.

The damping segment 446 is shaped similarly to the damping segment 46. The damping segment 446 is formed to include a first radially-extending portion 453, a second radially-extending portion 455, and a curved intermediate portion 457 that extends between and interconnects the first radially-extending portion 453 and the second radially-extending portion 455 as shown in FIG. 10A.

The first radially-extending portion 453 engages an aft wall 462 of the first flange 452 as shown in FIG. 10A. The second radially-extending portion 455 engages a forward wall 464 of the third flange 456. An entirety of the damping segment 446 is located axially between the first flange 452 and the third flange 456.

Figure 10B:
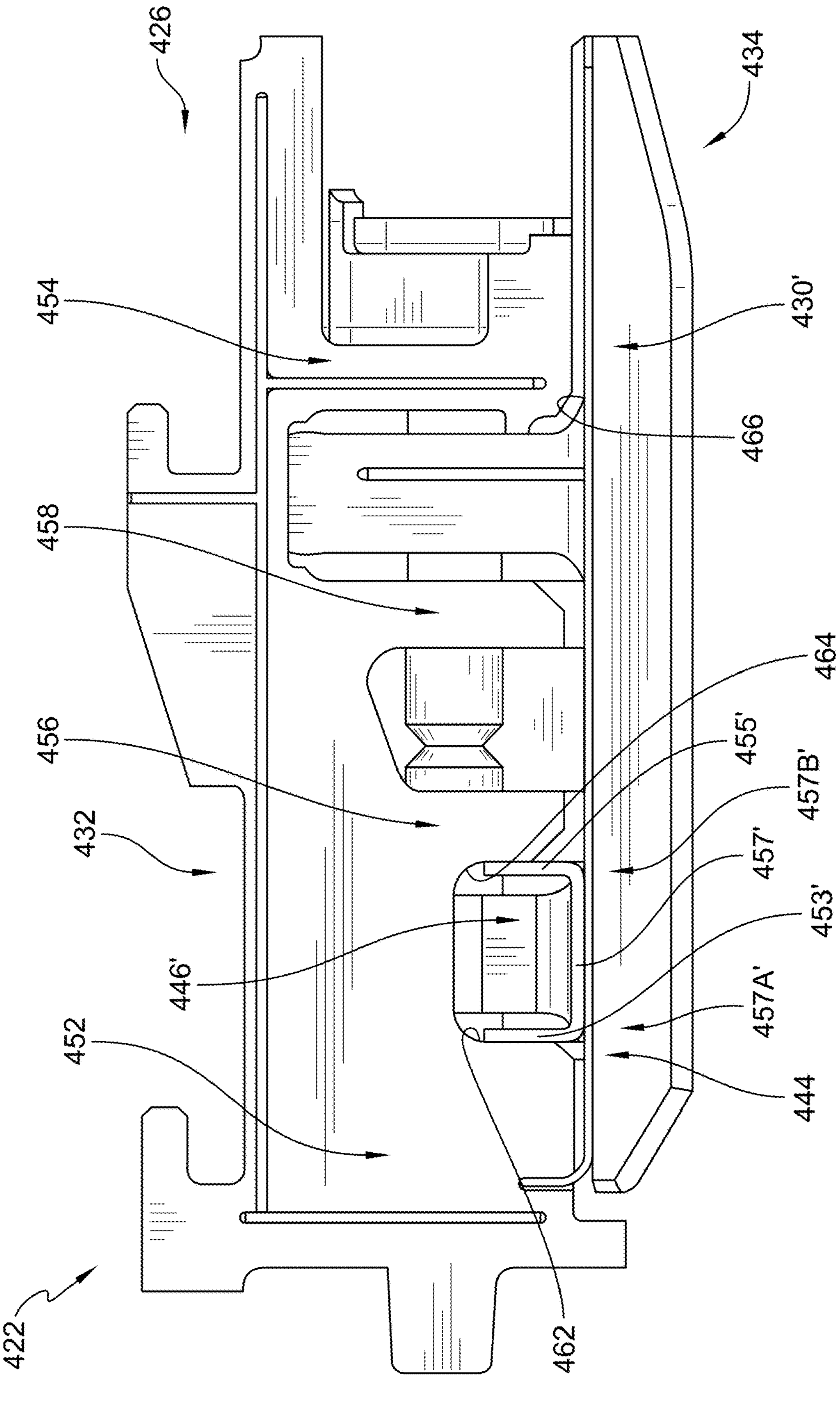
FIG. 10B is a side elevation view of another embodiment of a damping segment for use with the turbine shroud assembly of FIG. 10A showing that the u-shaped damping segment engages the body segment and is located axially between the first flange and the third flange of the first carrier segment to engage each of the flanges to urge the body segment radially inward against the first blade track segment to dampen flutter movement of the body segment.

Another embodiment of a damping segment 446' for use with the first shroud segment 426 of FIG. 10A is shown in FIG. 10B. The damping segment 446' is substantially similar to the damping segment 446 shown in FIG. 10A and described herein. Accordingly, similar reference numbers including a prime indicate features that are common between the damping segment 446' and the damping segment 446. The description of the damping segment 446 is incorporated by reference to apply to the damping segment 446', except in instances when it conflicts with the specific description and the drawings of the damping segment 446.

The damping segment 446' engages the radial outer surface 466 of the body segment 444, the first flange 452, and the third flange 456 of the first carrier segment 432 as shown in FIG. 10B. The damping segment 446' abuts each of the first flange 452 and the third flange 456. In the illustrative embodiment, the curvilinear path forms a u-shape. The damping segment 446' is formed to include a first radially-extending portion 453', a second radially-extending portion 455', and an intermediate portion 457' that extends between and interconnects the first radially-extending portion 453' and the second radially-extending portion 455'. The intermediate portion 457' extends between a forward end 457A' and an aft end 457B'.

The first radially-extending portion 453' extends axially forward and radially outward from the forward end 457A' of the intermediate portion 457' as shown in FIG. 10B. The first radially-extending portion 453' engages the aft wall 462 of the first flange 452. The second radially-extending portion 455' extends axially aft and radially outward from the aft end 457B' of the intermediate portion 457'. The second radially-extending portion 455' engages the forward wall 464' of the third flange 456 as shown in FIG. 10B. An entirety of the damping segment 446' is located axially between the first flange 452 and the third flange 456. The intermediate portion 457' extends axially along the radial outer surface 466 of the body segment 444 as shown in FIG. 10B. The intermediate portion 457' is substantially flush with the body segment 444.

Figure 11:
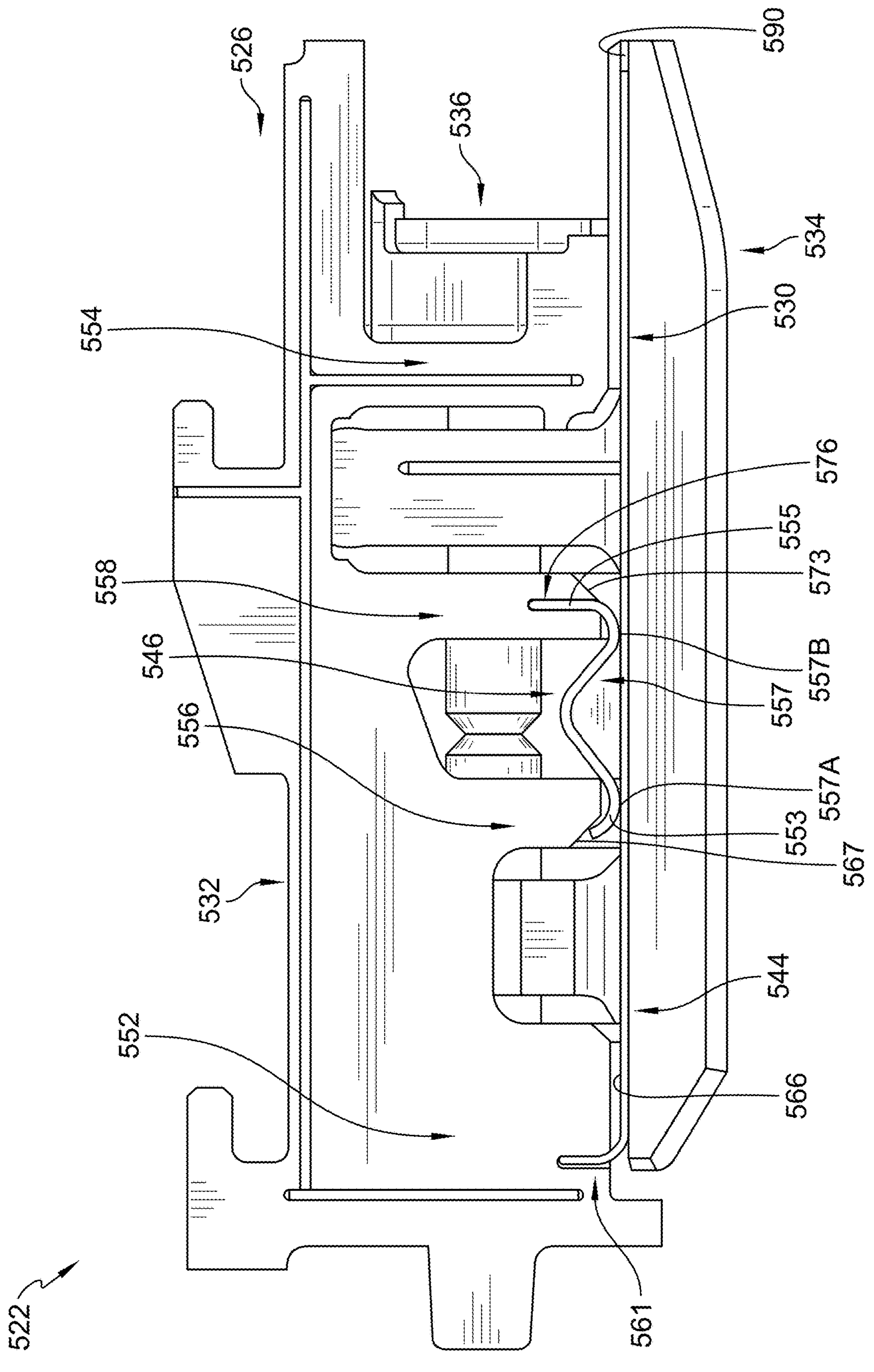
FIG. 11 is a side elevation view of another embodiment of a turbine shroud assembly for use in the gas turbine engine of FIG. 1 showing that a damping strip seal assembly includes a body segment that extends axially along a radial outer surface of a first blade track segment and a w-shaped damping segment engages the body segment and extends into a fourth flange of a first carrier segment to urge the body segment radially inward against the first blade track segment to dampen flutter movement of the body segment.

Another embodiment of a turbine shroud assembly 522 in accordance with the present disclosure is shown in FIG. 11. The turbine shroud assembly 522 is substantially similar to the turbine shroud assembly 22 shown in FIGS. 1-5 and described herein, the turbine shroud assembly 222 shown in FIG. 8 and described herein, the turbine shroud assembly 322 shown in FIG. 9 and described herein, and the turbine shroud assembly 422 show in FIG. 10A and described herein. Accordingly, similar reference numbers in the 500 series indicate features that are common between the turbine shroud assemblies 22, 222, 322, 422, 522. The descriptions of the turbine shroud assemblies 22, 222, 322, 422 are incorporated by reference to apply to the turbine shroud assembly 522, except in instances when it conflicts with the specific description and the drawings of the turbine shroud assembly 522. The turbine shroud assembly 522, as compared to the turbine shroud assembly 22, is the same expect that a third flange 556 is formed without a seal-retaining slot and a different damping segment 546 is included in a damping strip seal assembly 530.

A first shroud segment 526 of the turbine shroud assembly 522 includes the first carrier segment 532, a first blade track segment 534, and a first retainer 536 as shown in FIG. 11. The first carrier segment 532 includes a first flange 552, a second flange 554, a third flange 556, and a fourth flange 558. The first flange 552 is formed to include a first body-retaining slot 561, which is similar to the first body-retaining slot 61.

The third flange 556 of the first carrier segment 532 is illustratively formed without a seal-retaining slot as shown in FIG. 11. The fourth flange 558 of the first carrier segment 532 is formed to include a seal-retaining slot 576. The seal-retaining slot 576 extends radially outward into the fourth flange 558 from a radially inward facing surface 573 of the fourth flange 558.

The first blade track segment 534 is similar to the first blade track segment 34, and the first retainer 536 is similar to the first retainer 36. A body segment 544 is similar to the body segment 44.

The damping segment 546 extends along a curvilinear path and engages a radial outer surface 566 of the body segment 544 and at least one of the first flange 552, the second flange 554, the third flange 556, and the fourth flange 558 of the first carrier segment 532 as shown in FIG. 11. In the illustrative embodiment, the curvilinear path forms a w-shape. The damping segment 546 is formed to include a first radially-extending portion 553, a second radially-extending portion 555, and a curved intermediate portion 557 that extends between and interconnects the first radially-extending portion 553 and the second radially-extending portion 555. The first radially-extending portion 553 forms the forward-most end of the damping segment 546, and the second radially-extending portion 555 forms the aft-most end of the damping segment 546. The curved intermediate portion 557 extends between a forward end 557A and an aft end 557B.

The first radially-extending portion 553 extends radially outward and axially forward from the forward end 557A of the curved intermediate portion 557 as shown in FIG. 11. The first radially-extending portion 553 engages a radially inward facing surface 567 of the third flange 556. The second radially-extending portion 555 extends axially aft and radially outward from the aft end 557B of the curved intermediate portion 557 and into the seal-retaining slot 576 formed in the fourth flange 558 of the first carrier segment 532. The second radially-extending portion 555 extending into the seal-retaining slot 576 retains the damping segment 546 axially relative to the first shroud segment 526. Illustratively, the first radially-extending portion 553 has a height that is less than a height of the second radially-extending portion 555.

The curved intermediate portion 557, from the forward end 557A thereof, extends radially outward and axially aft to a peak 559 of the curved intermediate portion 557 as shown in FIG. 11. From the peak 559, the curved intermediate portion 557 extends radially inward and axially aft to the aft end 557B thereof. The forward end 557A and the aft end 557B of the curved intermediate portion 557 each engage the radial outer surface 566 of the body segment 544 as shown in FIG. 11.

A seal-retaining slot similar to the seal-retaining slot 576 is formed in the second carrier segment. In some embodiments, a height of the seal-retaining slot 576 may be less than a height of the seal-retaining slot formed in the second carrier segment, similar to the slots described in relation to FIG. 7. In some embodiments, the second radially-extending portion 555 may be formed to include a notch, and the seal-retaining slot 576 of the first carrier segment 532 and the seal-retaining slot of the second carrier segment may have the same height, similar to the slots described in relation to FIG. 8.

Figure 12:
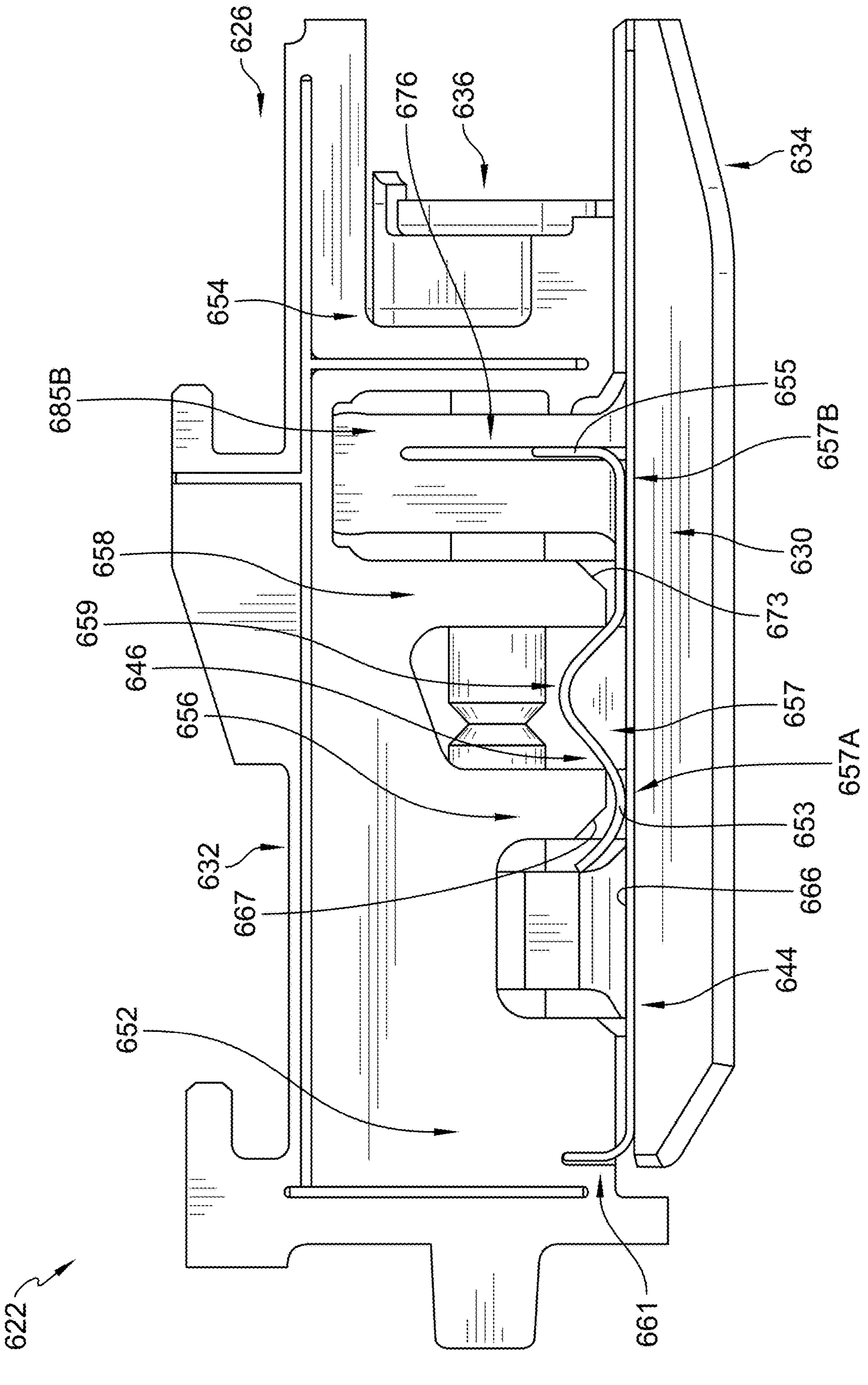
FIG. 12 is a side elevation view of another embodiment of a turbine shroud assembly for use in the gas turbine engine of FIG. 1 showing that a damping strip seal assembly includes a body segment that extends axially along a radial outer surface of a first blade track segment and a w-shaped damping segment engages the body segment and extends into an attachment flange of the first blade track segment, the damping segment engaging a radially inward facing surface of each of a third flange and a fourth flange of a first carrier segment to urge the body segment radially inward against the first blade track segment to dampen flutter movement of the body segment.

Another embodiment of a turbine shroud assembly 622 in accordance with the present disclosure is shown in FIG. 12. The turbine shroud assembly 622 is substantially similar to the turbine shroud assembly 22 shown in FIGS. 1-5 and described herein, the turbine shroud assembly 222 shown in FIG. 8 and described herein, the turbine shroud assembly 322 shown in FIG. 9 and described herein, the turbine shroud assembly 422 show in FIG. 10A and described herein, and the turbine shroud assembly 522 show in FIG. 11 and described herein. Accordingly, similar reference numbers in the 600 series indicate features that are common between the turbine shroud assemblies 22, 222, 322, 422, 522, 622. The descriptions of the turbine shroud assemblies 22, 222, 322, 422, 522 are incorporated by reference to apply to the turbine shroud assembly 622, except in instances when it conflicts with the specific description and the drawings of the turbine shroud assembly 622. The turbine shroud assembly 622, as compared to the turbine shroud assembly 22, is similar expect that a third flange 656 and a fourth flange 658 are formed without seal-retaining slots and a different damping segment 646 is included in a damping strip seal assembly 630.

A first shroud segment 626 of the turbine shroud assembly 622 includes the first carrier segment 632, a first blade track segment 634, and a first retainer 636 as shown in FIG. 12. The first carrier segment 632 includes a first flange 652, a second flange 654, a third flange 656, and a fourth flange 658. The first flange 652 is formed to include a first body-retaining slot 661, which is similar to the first body-retaining slot 61.

The third flange 656 and the fourth flange 658 of the first carrier segment 632 are illustratively formed without seal-retaining slots as shown in FIG. 12. The first blade track segment 634 is similar to the first blade track segment 34, and the first retainer 636 is similar to the first retainer 36. A body segment 644 is similar to the body segment 44.

The damping segment 646 extends along a curvilinear path and engages a radial outer surface 666 of the body segment 644 and at least one of the first flange 652, the second flange 654, the third flange 656, and the fourth flange 658 of the first carrier segment 632 as shown in FIG. 12. In the illustrative embodiment, the curvilinear path forms a w-shape. The damping segment 646 is formed to include a first radially-extending portion 653, a second radially-extending portion 655, and an intermediate portion 657 that extends between and interconnects the first radially-extending portion 653 and the second radially-extending portion 655. The first radially-extending portion 653 forms the forward-most end of the damping segment 646, and the second radially-extending portion 655 forms the aft-most end of the damping segment 646. The intermediate portion 657 extends between a forward end 657A and an aft end 657B.

The first radially-extending portion 653 extends radially outward and axially forward from the forward end 657A of the intermediate portion 657 as shown in FIG. 12. The first radially-extending portion 653 extends into a space axially between the first flange 652 and the third flange 656. The second radially-extending portion 655 extends axially aft and radially outward from the aft end 657B of the intermediate portion 657 and into a seal-retaining slot 676 formed in a second attachment flange 685B of the first blade track segment 634. The second radially-extending portion 655 extending into the seal-retaining slot 676 of the second attachment flange 685B retains the damping segment 646 axially relative to the first shroud segment 626.

In other embodiments described herein, the strip seal 110 extends into the slot formed in the second attachment flange of the first blade track segment. Thus, in the turbine shroud assembly 622, a strip seal similar to the strip seal 110 is omitted.

The intermediate portion 657, from the forward end 657A thereof, extends radially outward and axially aft to a peak 659 of the intermediate portion 657 as shown in FIG. 12. From the peak 659, the intermediate portion 657 extends radially inward and axially aft to the aft end 657B thereof. At least a portion of the intermediate portion 657 axially between the peak 659 and the aft end 657B is substantially flush with the radial outer surface 666 of the body segment 644. The peak 659 is located axially between the third flange 656 and the fourth flange 658.

The intermediate portion 657 engages a radially inward facing surface 667 of the third flange 656 near the forward end 657A thereof as shown in FIG. 12. The intermediate portion 657 engages a radially inward facing surface 673 of the fourth flange 658 axially aft of the peak 659.

Figure 13:
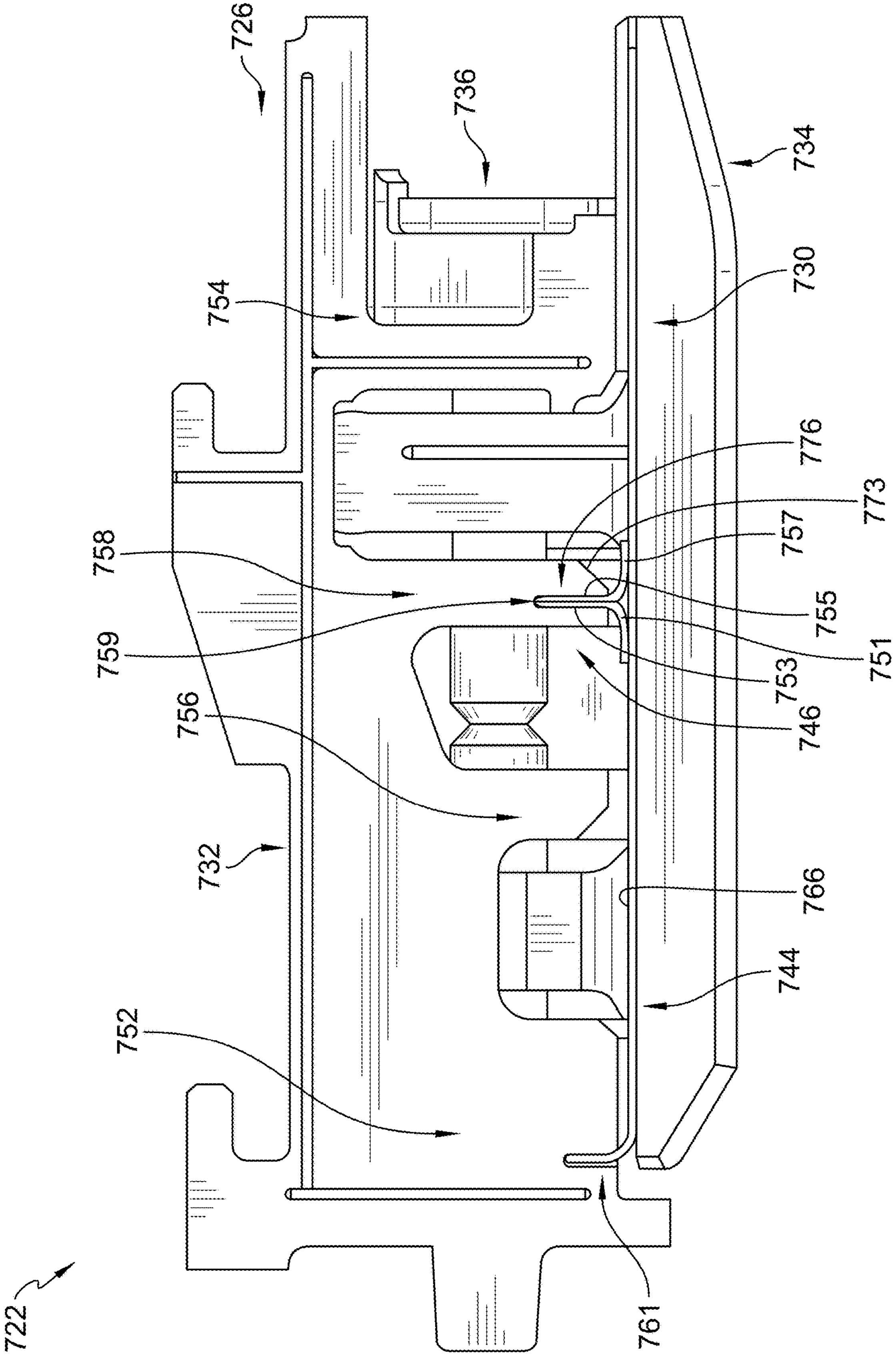
FIG. 13 is a side elevation view of another embodiment of a turbine shroud assembly for use in the gas turbine engine of FIG. 1 showing that a damping strip seal assembly includes a body segment that extends axially along a radial outer surface of a first blade track segment and a u-shaped damping segment that engages the body segment and extends into a fourth flange of a first carrier segment to urge the body segment radially inward against the first blade track segment to dampen flutter movement of the body segment.

Another embodiment of a turbine shroud assembly 722 in accordance with the present disclosure is shown in FIG. 13. The turbine shroud assembly 722 is substantially similar to the turbine shroud assembly 22 shown in FIGS. 1-5 and described herein, the turbine shroud assembly 222 shown in FIG. 8 and described herein, the turbine shroud assembly 322 shown in FIG. 9 and described herein, the turbine shroud assembly 422 show in FIG. 10A and described herein, the turbine shroud assembly 522 show in FIG. 11 and described herein, and the turbine shroud assembly 622 shown in FIG. 12 and described herein. Accordingly, similar reference numbers in the 700 series indicate features that are common between the turbine shroud assemblies 22, 222, 322, 422, 522, 622, 722. The descriptions of the turbine shroud assemblies 22, 222, 322, 422, 522, 622 are incorporated by reference to apply to the turbine shroud assembly 722, except in instances when it conflicts with the specific description and the drawings of the turbine shroud assembly 722. The turbine shroud assembly 722, as compared to the turbine shroud assembly 22, is similar expect that a third flange 756 is formed without a seal-retaining slot and a different damping segment 746 is included in a damping strip seal assembly 730.

A first shroud segment 726 of the turbine shroud assembly 722 includes the first carrier segment 732, a first blade track segment 734, and a first retainer 736 as shown in FIG. 13. The first carrier segment 732 includes a first flange 752, a second flange 754, a third flange 756, and a fourth flange 758. The first flange 752 is formed to include a first body-retaining slot 761, which is similar to the first body-retaining slot 61.

The third flange 756 of the first carrier segment 732 is illustratively formed without a seal-retaining slot as shown in FIG. 13. The fourth flange 758 of the first carrier segment 732 is formed to include a seal-retaining slot 776. The seal-retaining slot 776 extends radially outward into the fourth flange 758 from a radially inward facing surface 773 of the fourth flange 758. Illustratively, the seal-retaining slot 776 extends straight radially outward from the radially inward facing surface 773.

The first blade track segment 734 is similar to the first blade track segment 34, and the first retainer 736 is similar to the first retainer 36. A body segment 744 is similar to the body segment 44.

The damping segment 746 extends along a curvilinear path and engages a radial outer surface 766 of the body segment 744 and the fourth flange 758 of the first carrier segment 732 as shown in FIG. 13. In the illustrative embodiment, the curvilinear path forms an upside down u-shape.

The damping segment 746 is formed to include a first axially-extending portion 751, a first radially-extending portion 753, a second radially-extending portion 755, and a second axially-extending portion 757 as shown in FIG. 13. The first axially-extending portion 751 extends axially along the body segment 744. The first radially-extending portion 753 extends axially aft and radially outward from the first axially-extending portion 751. At a peak 759 of the damping segment 746, the second radially-extending portion 755 extends radially inward and axially aft from the first radially-extending portion 753. The second axially-extending portion 757 extends axially aft from the second radially-extending portion 755 along the body segment 744. At least a portion of each of the first and second radially-extending portions 753, 755 extends into the seal-retaining slot 776 formed in the fourth flange 758.

A method of assembling the turbine shroud assembly 22, 222, 322, 422, 522, 622, 722 for use with the gas turbine engine 10 is provided herein. The method includes assembling the first shroud segment 26, 226, 426, 526, 626, 726 by coupling the first blade track segment 34, 234, 434, 534, 634, 734 with the first carrier segment 32, 232, 432, 532, 632, 732 to support the first blade track segment 34, 234, 434, 534, 634, 734 radially inward of the first carrier segment 32, 232, 432, 532, 632, 732.

The method includes assembling the second shroud segment 28, 228 by coupling the second blade track segment 40, 240 with the second carrier segment 38, 238 to support the second blade track segment 40, 240 radially inward of the second carrier segment 38, 238. The method includes providing the damping strip seal assembly 30, 30', 230, 330, 430, 430', 530, 630, 730 that includes the body segment 44, 44, 244, 344, 444, 544, 644, 744 and the damping segment 46, 46', 246, 346, 446, 446', 546, 646, 746.

The method includes locating the body segment 44, 44, 244, 344, 444, 544, 644, 744 of the damping strip seal assembly 30, 30', 230, 330, 430, 430', 530, 630, 730 on the first radial outer surface 90, 590 of the first blade track segment 34, 234, 434, 534, 634, 734.

The method includes sliding the damping segment 46, 46', 246, 346, 446, 446', 546, 646, 746 onto a radial outer surface 66, 466, 566, 666, 766 of the body segment 44, 44, 244, 344, 444, 544, 644, 744 and axially between the first flange 52, 452, 552, 652, 752 and the second flange 54, 454, 554, 654, 754 so that the damping segment 46, 46', 246, 346, 446, 446', 546, 646, 746 engages at least one of the first flange 52, 452, 552, 652, 752, the second flange 54, 454, 554, 654, 754, the third flange 56, 256, 456, 556, 656, 756 and the fourth flange 58, 458, 558, 658, 758. The method includes locating a radially-extending portion 55, 55', 555, 753, 755 of the damping segment 46, 46', 546, 746 in a seal-retaining slot 76, 576, 767 formed in the fourth flange 58, 558, 758 so that the radially-extending portion 55, 55', 555, 753, 755 engages the fourth flange 58, 558, 758.

The method includes urging the body segment 44, 44, 244, 344, 444, 544, 644, 744 of the damping strip seal assembly 30, 30', 230, 330, 430, 430', 530, 630, 730 radially inward against the first blade track segment 34, 234, 434, 534, 634, 734 and the second blade track segment 40, 240 through engagement of the damping segment 46, 46', 246, 346, 446, 446', 546, 646, 746 with the at least one of the first flange 52, 452, 552, 652, 752, the second flange 54, 454, 554, 654, 754, the third flange 56, 256, 456, 556, 656, 756, and the fourth flange 58, 458, 558, 658, 758.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising:

a first shroud segment including a first carrier segment arranged circumferentially at least partway around a central axis and a first blade track segment supported by the first carrier segment to define a portion of a gas path of the turbine shroud assembly, the first carrier segment having a first outer wall, a first flange that extends radially inward from the first outer wall, a second flange axially spaced apart from the first flange and extending radially inward from the first outer wall, a third flange that extends radially inward from the first outer wall and is located axially between the first flange and the second flange, and a fourth flange that extends radially inward from the first outer wall and is located axially between the third flange and the second flange, a second shroud segment arranged circumferentially adjacent the first shroud segment about the central axis, the second shroud segment including a second carrier segment and a second blade track segment supported by the second carrier segment to define another portion of the gas path of the turbine shroud assembly, and a damping strip seal assembly extending circumferentially into the first shroud segment and the second shroud segment to block gases from passing radially between the first shroud segment and the second shroud segment, the damping strip seal assembly including a body segment that extends axially along a first radial outer surface of the first blade track segment and a second radial outer surface of the second blade track segment to block the gases from passing radially between the first shroud segment and the second shroud segment and a damping segment that extends along a curvilinear path and engages the body segment and at least one of the first flange, the second flange, the third flange, and the fourth flange to urge the body segment of the damping strip seal assembly radially inward against the first blade track segment and the second blade track segment to dampen flutter movement of the body segment.

2. The turbine shroud assembly of claim 1, wherein the first flange of the first carrier segment includes a first wall and a first protrusion that extends radially inward from the first wall to cover a first axial end of the first blade track segment, the first wall is formed to include a radial inward facing surface and a body-retaining slot extends radially outward into the first flange from the radially inward facing surface to receive at least a portion of the body segment therein.

3. The turbine shroud assembly of claim 1, wherein the body segment is formed to include an axially-extending portion and a radially-extending portion that extends axially forward and radially outward from the axially-extending portion into a body-retaining slot formed in the first flange of the first carrier segment to retain the body segment axially relative to the first shroud segment.

4. The turbine shroud assembly of claim 1, wherein the damping segment is formed to include a first radially-extending portion at a forward end of the damping segment and a second radially-extending portion at an aft end of the damping segment, the first radially-extending portion extends into a first seal-retaining slot formed in the third flange to engage the third flange and the second radially-extending portion extends into a second seal-retaining slot formed in the fourth flange to engage the fourth flange.

5. The turbine shroud assembly of claim 4, wherein the damping segment is w-shaped and includes a curved intermediate portion that extends between and interconnects the first radially-extending portion and the second radially-extending portion.

6. The turbine shroud assembly of claim 4, wherein the damping segment is u-shaped and includes an intermediate portion that extends between and interconnects the first radially-extending portion and the second radially-extending portion.

7. The turbine shroud assembly of claim 1, wherein the damping segment is located axially between the first flange and the third flange and the damping segment is formed to include a first radially-extending portion at a forward end of the damping segment and a second radially-extending portion at an aft end of the damping segment, the first radially-extending portion abuts an aft wall of the first flange and the second radially-extending portion abuts a forward wall of the third flange.

8. The turbine shroud assembly of claim 1, wherein the first blade track segment includes a first shroud wall that extends circumferentially partway around the central axis, a first attachment flange that extends radially outward from the first shroud wall, and a second attachment flange that extends radially outward from the first shroud wall axially aft of the first attachment flange, and wherein the damping segment is w-shaped and includes a first portion that extends into a space between the first flange and the third flange, a second portion that extends into the second attachment flange, and an intermediate portion that extends between and interconnects the first portion and the second portion and is located between the third flange and the fourth flange.

9. The turbine shroud assembly of claim 1, wherein the damping segment includes a first radially-extending portion and a second radially-extending portion coupled with the first radially-extending portion at a radial peak of the damping segment, the first radially-extending portion and the second radially-extending portion extend into a seal-retaining slot formed in the fourth flange to engage the fourth flange.

10. The turbine shroud assembly of claim 1, wherein the damping segment is w-shaped and includes a first portion that engages a radially inward facing surface of the third flange, a second portion that extends into the fourth flange, and an intermediate portion that extends between and interconnects the first portion and the second portion and is located axially between the third flange and the fourth flange.

11. The turbine shroud assembly of claim 1, wherein the first blade track segment includes a first shroud wall that extends circumferentially partway around the central axis and a first attachment feature that extends radially outward from the first shroud wall, wherein a circumferential end of the first shroud wall is formed with a first recess to define a first shoulder that provides the first radial outer surface of the first blade track segment, the second blade track segment includes a second shroud wall that extends circumferentially partway around the central axis and a second attachment feature that extends radially outward from the second shroud wall, wherein a circumferential end of the second shroud wall is formed with a second recess to define a second shoulder that provides the second radial outer surface of the second blade track segment, and wherein the body segment of the damping strip seal assembly engages the first shoulder and the second shoulder.

12. A turbine shroud assembly for use with a gas turbine engine, the turbine shroud assembly comprising:

a first shroud segment including a first carrier segment arranged circumferentially at least partway around a central axis and a first blade track segment coupled with the first carrier segment to define a portion of a gas path of the turbine shroud assembly, the first carrier segment having an outer wall, a first flange that extends radially inward from the outer wall, a second flange axially spaced apart from the first flange and extending radially inward from the outer wall, a third flange that extends radially inward from the outer wall and is located axially between the first flange and the second flange, and a fourth flange that extends radially inward from the outer wall and is located axially between the third flange and the second flange, a second shroud segment including a second carrier segment arranged circumferentially at least partway around a central axis and a second blade track segment supported by the second carrier segment, and a damping strip seal assembly having a body segment that engages a radial outer surface of the first blade track segment and a damping segment that engages a radial outer surface of the body segment and at least one of the third flange and the fourth flange of the first carrier segment to urge the body segment radially inward toward the radial outer surface of the first blade track segment.

13. The turbine shroud assembly of claim 12, wherein the first flange of the first carrier segment includes a first wall and a first protrusion that extends radially inward from the first wall to cover a first axial end of the first blade track segment, the first wall is formed to include a radial inward facing surface and a body-retaining slot extends radially outward into the first flange from the radially inward facing surface to receive at least a portion of the body segment therein.

14. The turbine shroud assembly of claim 12, wherein the damping segment is formed to include a first radially-extending portion at a forward end of the damping segment, a second radially-extending portion at an aft end of the damping segment, and an intermediate portion that extends between and interconnects the first radially-extending portion and the second radially-extending portion, the first radially-extending portion extends into a first seal-retaining slot formed in the third flange to engage the third flange and the second radially-extending portion extends into a second seal-retaining slot formed in the fourth flange to engage the fourth flange.

15. The turbine shroud assembly of claim 12, wherein the damping segment is located axially between the first flange and the third flange and the damping segment is formed to include a first radially-extending portion at a forward end of the damping segment and a second radially-extending portion at an aft end of the damping segment, the first radially-extending portion abuts an aft wall of the first flange and the second radially-extending portion abuts a forward wall of the third flange.

16. The turbine shroud assembly of claim 12, wherein the first blade track segment includes a shroud wall that extends circumferentially partway around the central axis, a first attachment flange that extends radially outward from the shroud wall, and a second attachment flange that extends radially outward from the shroud wall axially aft of the first attachment flange, and wherein the damping segment includes a first portion that extends into a space between the first flange and the third flange, a second portion that extends into the second attachment flange, and an intermediate portion that extends between and interconnects the first portion and the second portion and is located between the third flange and the fourth flange.

17. The turbine shroud assembly of claim 12, wherein the damping segment includes a first radially-extending portion and a second radially-extending portion coupled with the first radially-extending portion at a radial peak of the damping segment, the first radially-extending portion and the second radially-extending portion extend into a seal-retaining slot formed in the fourth flange to engage the fourth flange.

18. A method of assembling a turbine shroud assembly for use with a gas turbine engine comprising:

assembling a first shroud segment by coupling a first blade track segment with a first carrier segment to support the first blade track segment radially inward of the first carrier segment, the first carrier segment having an outer wall, a first flange that extends radially inward from the outer wall, a second flange axially spaced apart from the first flange and extending radially inward from the outer wall, a third flange that extends radially inward from the outer wall and is located axially between the first flange and the second flange, and a fourth flange that extends radially inward from the outer wall and is located axially between the third flange and the second flange, assembling a second shroud segment by coupling a second blade track segment with a second carrier segment to support the second blade track segment radially inward of the second carrier segment, providing a damping strip seal assembly that includes a body segment and a damping segment, locating the body segment of the damping strip seal assembly on a first radial outer surface of the first blade track segment, and sliding the damping segment onto a radial outer surface of the body segment and axially between the first flange and the second flange so that the damping segment engages at least one of the first flange, the second flange, the third flange, and the fourth flange.

19. The method of claim 18, further comprising locating a radially-extending portion of the damping segment in a seal-retaining slot formed in the fourth flange so that the radially-extending portion engages the fourth flange.

20. The method of claim 18, further comprising urging the body segment of the damping strip seal assembly radially inward against the first blade track segment and the second blade track segment through engagement of the damping segment with the at least one of the first flange, the second flange, the third flange, and the fourth flange.

* * * * *